United States Patent
Shapiro

(10) Patent No.: US 11,457,005 B1
(45) Date of Patent: Sep. 27, 2022

(54) SECURE EXCHANGE OF DIGITAL CONTENT

(71) Applicant: Securus Technologies, Inc., Carrollton, TX (US)

(72) Inventor: Ryan Jacob Shapiro, Bay Harbor Islands, FL (US)

(73) Assignee: Securus Technologies, LLC, Carrollton, TX (US)

( * ) Notice: Subject to any disclaimer, the term of this patent is extended or adjusted under 35 U.S.C. 154(b) by 218 days.

(21) Appl. No.: 16/795,355

(22) Filed: Feb. 19, 2020

Related U.S. Application Data

(63) Continuation of application No. 13/783,863, filed on Mar. 4, 2013, now abandoned, which is a
(Continued)

(51) Int. Cl.
*H04L 9/40* (2022.01)
*G06Q 30/06* (2012.01)
(Continued)

(52) U.S. Cl.
CPC .............. *H04L 63/08* (2013.01); *G06F 21/10* (2013.01); *G06Q 10/107* (2013.01); *G06Q 30/02* (2013.01);
(Continued)

(58) Field of Classification Search
None
See application file for complete search history.

(56) References Cited

U.S. PATENT DOCUMENTS 5,517,014 A * 5/1996 Iijima .................. G06Q 20/341
235/492
5,805,741 A 9/1998 Shinohara
(Continued)

FOREIGN PATENT DOCUMENTS

WO WO2004001745 A1 * 12/2003

OTHER PUBLICATIONS

Mark Harris, "iTunes Store history—The History of the iTunes Store", About.com, web page retrieved on Jun. 14, 2013 indicating that iTunes was first launched on Apr. 28, 2003, 3 Pages.
(Continued)

*Primary Examiner* — Kaveh Abrishamkar
(74) *Attorney, Agent, or Firm* — Fogarty LLP

(57) ABSTRACT

The invention includes delivering and monitoring digital content distributed to correctional facility inmates, giving supervisory authorities the ability to screen the incoming digital content. Digital content can include email, and stored and steamed video content, and can be scanned for keywords by supervisory authorities before delivery to an inmate. A computer kiosk can be used by inmates to view and record digital video content. A portable player is provided to inmates which can be used to play, and in some embodiments record, digital content. The player is issued to a particular inmate, and can only be used with respect to that particular inmate's digital content. The kiosk, and in some embodiments, the player, can be used to shop for items available at a store, for example a commissary.

20 Claims, 21 Drawing Sheets

Related U.S. Application Data continuation of application No. 12/814,201, filed on Jun. 11, 2010, now abandoned, which is a continuation-in-part of application No. 11/041,431, filed on Jan. 21, 2005, now abandoned.

(60) Provisional application No. 60/538,933, filed on Jan. 22, 2004.

(51) Int. Cl.
  *G06Q 30/02* (2012.01)
  *G06Q 10/10* (2012.01)
  *G06F 21/10* (2013.01)
  *H04L 51/212* (2022.01)

(52) U.S. Cl.
  CPC ....... *G06Q 30/0603* (2013.01); *H04L 51/212* (2022.05); *H04L 63/06* (2013.01); *H04L 63/102* (2013.01); *H04L 63/30* (2013.01)

(56) References Cited

U.S. PATENT DOCUMENTS

| | | | | |
|---|---|---|---|---|
| 6,105,138 | A * | 8/2000 | Arakawa | G06F 11/1441 713/300 |
| 6,192,114 | B1 | 2/2001 | Council | |
| 6,378,769 | B1 | 4/2002 | Wolgamot | |
| 6,665,380 | B1 | 12/2003 | Cree et al. | |
| 6,668,045 | B1 * | 12/2003 | Mow | H04M 3/2281 379/67.1 |
| 6,687,340 | B1 | 2/2004 | Goldberg et al. | |
| 6,829,596 | B1 * | 12/2004 | Frazee | G06Q 20/3558 705/66 |
| 7,346,617 | B2 | 3/2008 | Wong | |
| 7,493,289 | B2 | 2/2009 | Verosub et al. | |
| 7,548,851 | B1 | 6/2009 | Lau et al. | |
| 7,640,190 | B1 | 12/2009 | Sullivan et al. | |
| 7,647,380 | B2 | 1/2010 | Gillum et al. | |
| 7,657,925 | B2 | 2/2010 | Pesati et al. | |
| 7,661,141 | B2 | 2/2010 | Dutta et al. | |
| 8,204,177 | B2 * | 6/2012 | Harper | G06Q 30/0601 379/45 |
| 8,364,595 | B1 | 1/2013 | Ringewald | |
| 2002/0167500 | A1 * | 11/2002 | Gelbman | G09G 3/344 345/204 |
| 2003/0126470 | A1 | 7/2003 | Crites et al. | |
| 2003/0134620 | A1 | 7/2003 | Dutta et al. | |
| 2003/0159040 | A1 * | 8/2003 | Hashimoto | G06F 21/35 713/168 |
| 2003/0177030 | A1 | 9/2003 | Turner et al. | |
| 2004/0094618 | A1 * | 5/2004 | Okamura | G06Q 20/0457 235/380 |
| 2004/0114740 | A1 | 6/2004 | Gickler | |
| 2004/0140350 | A1 * | 7/2004 | Valencia | G07F 19/20 235/375 |
| 2004/0156483 | A1 | 8/2004 | Theobald | |
| 2005/0008133 | A1 | 1/2005 | Liu et al. | |
| 2005/0085779 | A1 | 4/2005 | Poulsen et al. | |
| 2005/0114192 | A1 | 5/2005 | Tor et al. | |
| 2005/0144133 | A1 * | 6/2005 | Hoffman | G07F 7/025 705/50 |
| 2006/0143463 | A1 * | 6/2006 | Ikeda | B60R 25/04 713/182 |
| 2007/0041545 | A1 | 2/2007 | Gainsboro | |
| 2007/0282751 | A1 * | 12/2007 | Zhang | G06Q 90/00 705/57 |
| 2008/0057976 | A1 * | 3/2008 | Rae | H04W 64/003 455/456.1 |
| 2010/0299761 | A1 | 11/2010 | Shapiro | |

OTHER PUBLICATIONS

EHow Contributor, "The History of Computer Scanners", eHow.com, web page retrieved on Jun. 15, 2013, indicating that computer scanners were known prior to Jun. 11, 2010 (filing date of parent), 4 Pages.

Author unknown, "The Rock" website, specifically the page concerning prisoner life, http://library.thinkquesl.org/J0113013/prisoner_life.htm, retrieved on Mar. 15, 2012.

Prison Talk website, "do prisoners get to have music?", http://www.prisonlalk.com/forums/archive/index.php/I-3709.html, retrieved on Mar. 15, 2012, forum dale Jan. 21, 2004.

\* cited by examiner

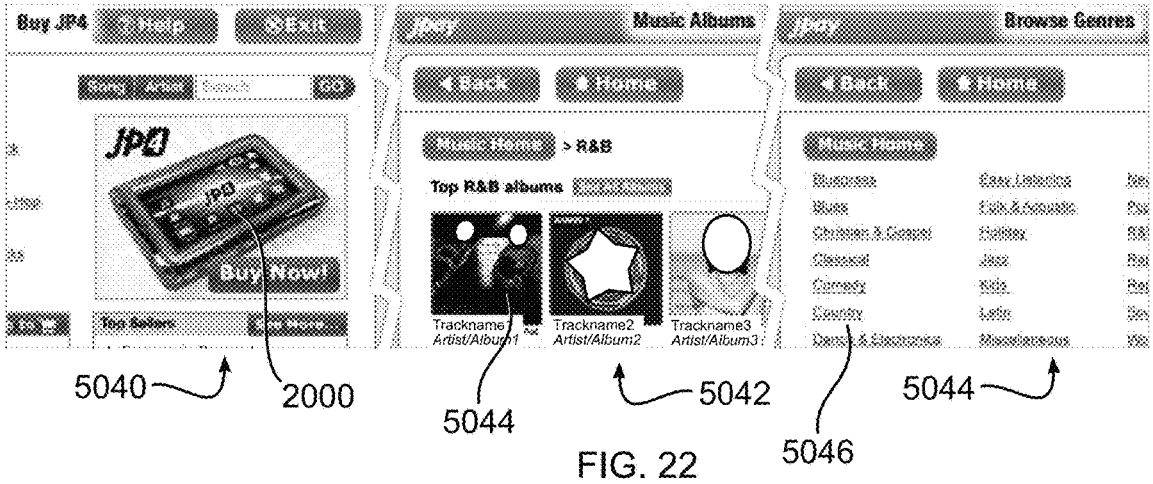
FIG. 22
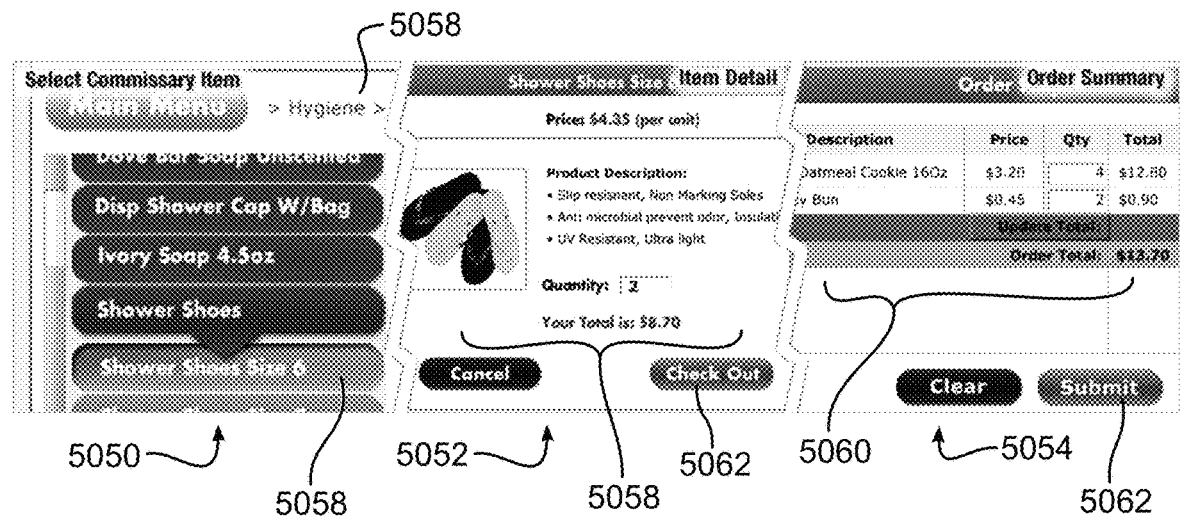
FIG. 23
FIG. 24
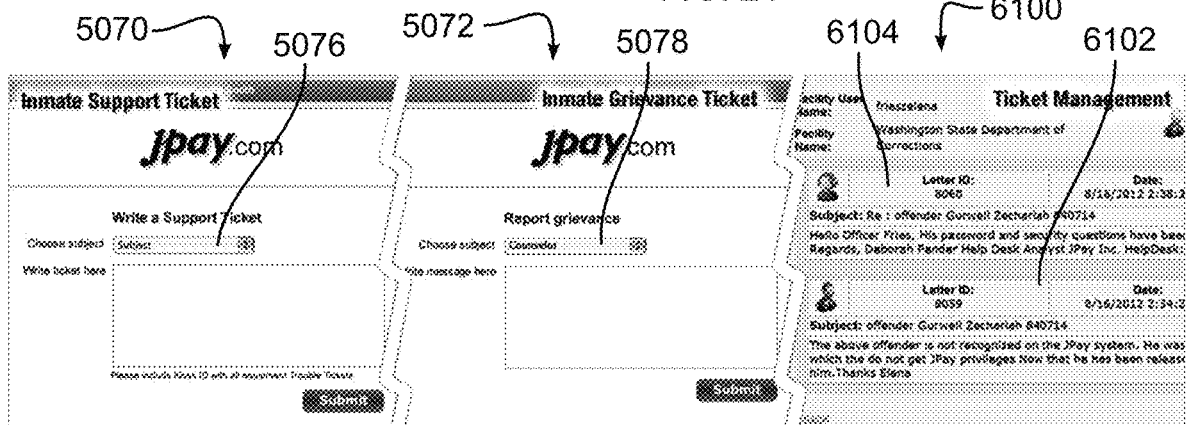

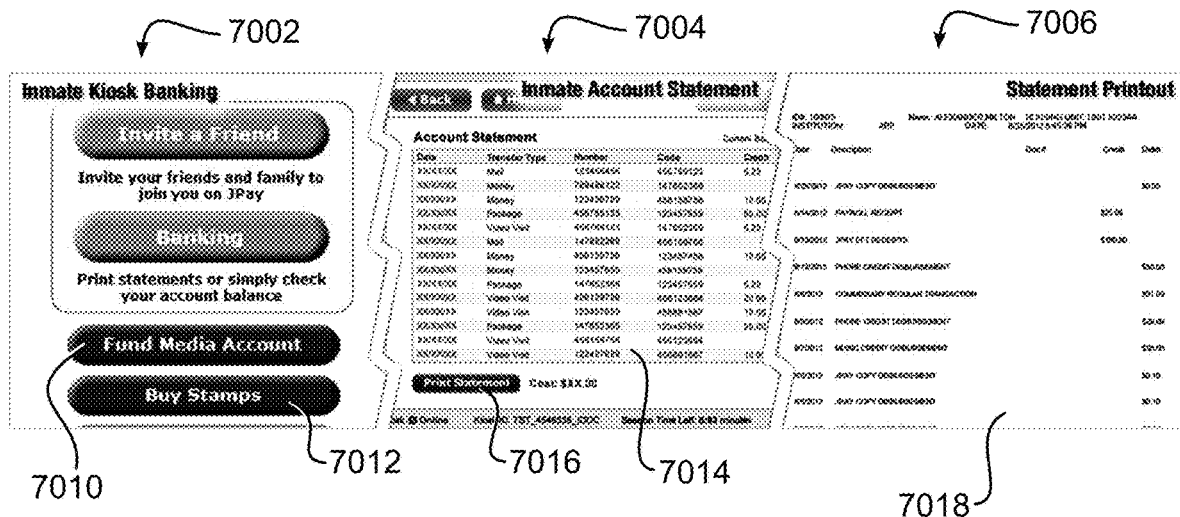
FIG. 25
FIG. 26
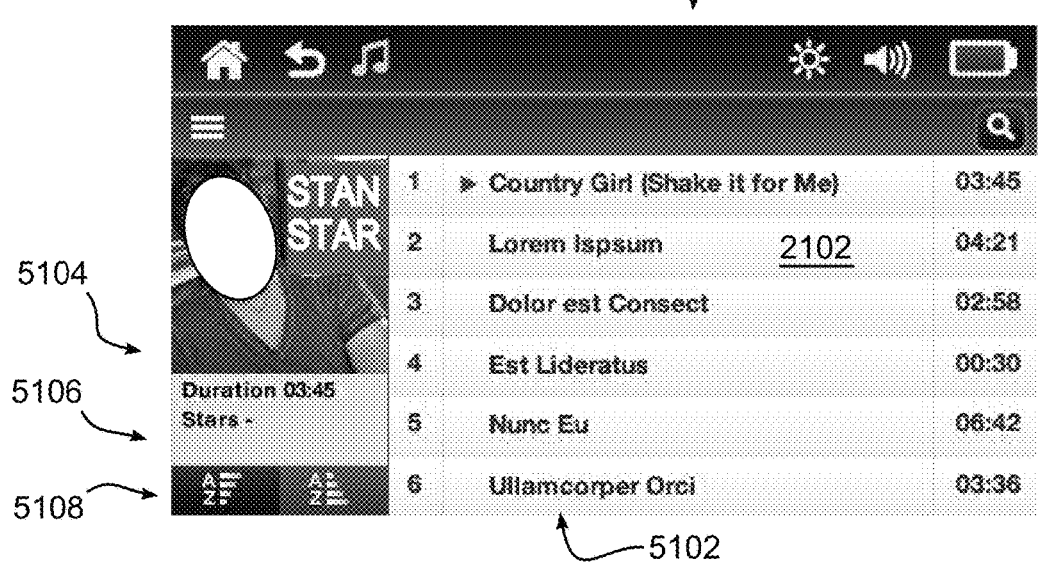

Facility System

Admin    Mail    Sign Out

Welcome WaDOCTest
Last Login: 07/05/2010 10:23AM EST

Letter Delivery Summary for the past [1 ▼] Months

Mail
- Letter Delivery
- Mail Reports
- Support Tickets Delivery
- Search
- Inbound Mail Operational Report
- Mail Operational Report
- Stamp Usage Report
- In Mail Discarded Material
- Recover Deleted Letters

Inbound

🚩 Requires Approval (376)
Click to view letters pending approval

📄 Ready To Release (24)
Click to view ready to release and ready to print letters 📄 Printed (2)
Click to view and reprint printed letters 📄 Released (737)
Click to view released letters 👤 Sent To I&I (0)
Click to view and approve letters sent to security 📄 Returned To Customer (0)
Click to view letters returned to customers 👤 Rejected (0)
Click to view censored letters

Outbound

🚩 Requires Approval (698)
Click to view letters pending approval

📄 Ready To Release (88)
Click to view ready to release letters

📄 Released (1031)
Click to view released letters

👤 Sent To I&I (0)
Click to view and approve letters sent to security

👤 Rejected (0)
Click to view censored letters

📄 Pending Print Items (32)
Click to view pending print items

📄 Printed Items (1349)
Click to view printed items

Facility System

Admin    Mail    Sign Out

Welcome WaDOCTest
Last Login: 07/05/2010 10:23AM EST

<<Back | Main | Requires Approval | Pending | Printed | I&I | Returned | Rejected | Released |

Mail
- Letter Delivery
- Mail Reports
- Support Tickets Delivery
- Search
- Inbound Mail Operational Report
- Mail Operational Report
- Stamp Usage Report
- In Mail Discarded Material
- Recover Deleted Letters

Requires Approval (flagged words)

Next Mail > Last Mail >>

Letter ID JPMSL 10813431

Inmate Name : TIMOTHY TISCHLER
Inmate ID : 321083
Housing : H4 H4039L
Date : 07/05/2010 9:04AM EST
Customer : Donna Robinson
Customer ID : 2659730
Suspicous Content : 42 words are in Spanish
Word(s) Found : • Love
Attachment(s) :

Click here to discard letter content. Discarded letters will be saved in the Discarded Material Bucket

| Approve Letter |
| Send To Sent To I&I |
| Returned To Customer |
| Send To Rejected |
| Mail History |
| Relocate Letter |

SECURE EXCHANGE OF DIGITAL CONTENT

CROSS REFERENCE TO RELATED APPLICATIONS

This application is a Continuation of U.S. application Ser. No. 13/783,863, filed Mar. 4, 2013, which is a Continuation in part of U.S. application Ser. No. 12/814,201, filed Jun. 11, 2010, which is a Continuation in part of U.S. application Ser. No. 11/041,431, filed Jan. 21, 2005, now abandoned, which claimed the benefit of U.S. Provisional Application No. 60/538,933, filed Jan. 22, 2004, the contents of all of which are hereby incorporated by reference in their entirety.

FIELD OF THE INVENTION

The present invention relates to the field of electronic communications. Specifically, the present invention relates to the delivery and access of electronic data by individuals in a restrained environment, such as correctional facility.

BACKGROUND OF INVENTION

Correction system authorities have found that receiving and distributing inmates' paper mail is a significant challenge. First, correction authorities frequently move inmates between correction facilities such as from a jail (where one is held prior to conviction) to a prison (where one is held after conviction). These movements, often on short notice, play havoc with conventional inmate mail. Conventional letters and other forms of correspondence, written on paper to be delivered to a physical address, are often lost or left "chasing" the inmate for years. This problem frustrates inmates, their families, attorneys and correction authorities.

Second, correction authorities read inmate mail, a difficult, time consuming and expensive task especially when the mail is handwritten. Opening and reading inmate mail costs the American corrections system over $100 million per year. Third, correction authorities have no present way of storing and indexing inmate paper mail for later retrieval and analysis. Fourth, correction authorities inspect inmate mail for drugs or other forbidden substances, a difficult, time consuming and expensive task because some inmates may have clever cohorts outside of prison. Furthermore, drugs that remain undetected impose a large but unquantifiable cost on the incarceration system due to their deleterious impact on medical costs and violence. Fifth, as of December 2002, the United States federal, state and local authorities, most of whom are in budget deficit, incarcerated over two million people at a cost of more than $40 billion per year.

These challenges are not limited to the delivery of letters. For example, correctional authorities spend more time inspecting packages with gifts to be delivered to inmates than they spend on inspecting letters.

SUMMARY OF THE INVENTION

In accordance with an embodiment of the disclosure, a system for managing an exchange of digital content between inmates in a correctional facility and non-inmates, comprises at least one computer server having a processor and connected to software stored on non-transitory media, the server software configure to obtain digital content from inmates or non-inmates, store the digital content until a staffperson of the correctional facility approves distribution of the digital content to an intended recipient, and distribute the digital content to the intended recipient if approved; and at least one inmate device having a processor, a digital display, and controls, the inmate device including software stored on non-transitory media, the device software configured to read stored assignment data pertaining to an inmate authorized to use the particular inmate device executing the device software, connect to the at least one computer server and transmit information pertaining to the inmate authorized to use the particular inmate device executing the device software, obtain approved digital content distributed by the server software and intended for the particular inmate authorized to use the particular inmate device connected to the at least one computer server, and present the digital content.

In various embodiments thereof, the server software is further configured to analyze the digital content to create a result set of keywords in the digital content; report the result set to a staffperson of the correctional facility; the digital content is video content; the digital content is streaming audio content, the digital audio content stored by the server software for a delay period sufficient to enable correctional facility staff to monitor and interrupt the stream if non-authorized content is streamed; the digital content is streaming video content, the digital video content stored by the server software for a delay period sufficient to enable correctional facility staff to monitor and interrupt the stream if non-authorized content is streamed.

In another embodiment thereof, the inmate device software is further configured to: obtain information pertaining to commissary items available for sale from the at least one server; and enable an inmate to select and request items from the obtained information, using the inmate device.

In a yet further embodiment thereof, the inmate device software is further configured to: obtain information pertaining to digital content available for downloading into the inmate device; enable an inmate to select and request digital content for downloading; and connect to the at least one server to obtain the digital content.

In other variations thereof, the inmate device software is further configured to allocate credits assigned to the inmate to pay a cost of obtaining the digital content; the inmate device is configured to only carry out an exchange of digital content with at least one of the at least one server; and the inmate device is configured to be unopenable by an inmate without using tools.

In another embodiment of the disclosure, a system for managing an exchange of digital content between inmates in a correctional facility and non-inmates, comprises at least one computer server having a processor and connected to software stored on non-transitory media, the server software configure to obtain digital video content from inmates or non-inmates, delay distribution of at least a portion of the digital video content until a staffperson of the correctional facility approves transmission of the at least a portion of digital video content to an intended recipient, and distribute the digital video content to the intended recipient if approved; and at least one inmate device having a processor, a digital display, and controls, the inmate device including software stored on non-transitory media, the device software configured to read stored assignment data pertaining to an inmate authorized to use the particular inmate device executing the device software, connect to the at least one computer server and transmit information pertaining to the inmate authorized to use the particular inmate device executing the device software, obtain the distributed digital video content distributed by the server software and intended for the particular inmate authorized to use the particular inmate device connected to the at least one computer server, and present the video digital content.

In various embodiments thereof, the server software is further configured to analyze the video digital content to create a result set of keywords in the digital content; the server software is further configured to report the result set to a staffperson of the correctional facility; the delay is sufficient to enable correctional facility staff to monitor and interrupt the video digital content if the digital video content contains non-authorized content; the digital content is streaming video content, the digital video content stored by the server software for a delay period sufficient to enable correctional facility staff to monitor and interrupt the stream if non-authorized content is streamed.

In an embodiment thereof, the inmate device software is further configured to: display information pertaining to commissary items available for sale from the at least one server; and enable an inmate to select and request items from the obtained information, using the inmate device.

In another embodiment thereof, the inmate device software is further configured to: obtain visual information pertaining to digital content available for downloading into the inmate device; enable an inmate to view, select and request digital content for downloading; connect to the at least one server to obtain the digital content.

In a yet further embodiment, the inmate device software is further configured to allocate credits assigned to the inmate to pay a cost of obtaining the digital content.

In a further embodiment of the disclosure, a method for managing an exchange of digital content between inmates in a correctional facility and non-inmates, comprises using at least one computer server having a processor and connected to software stored on non-transitory media, the server software configure to obtain digital video content from inmates or non-inmates, delay distribution of at least a portion of the digital video content until a staffperson of the correctional facility approves transmission of the at least a portion of digital video content to an intended recipient, and distribute the digital video content to the intended recipient if approved; and providing to at least one inmate a device having a processor, a digital display, and controls, the inmate device including software stored on non-transitory media, the device software configured to read stored assignment data pertaining to an inmate authorized to use the particular inmate device executing the device software, connect to the at least one computer server and transmit information pertaining to the inmate authorized to use the particular inmate device executing the device software, obtain the distributed digital video content distributed by the server software and intended for the particular inmate authorized to use the particular inmate device connected to the at least one computer server, and present the video digital content.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 22 depicts three display images of a local executable application of the disclosure, illustrating an offer to purchase a player, or music;

FIG. 23 illustrates three display images of a local executable application of the disclosure, illustrating purchase of supplies from a local commissary;

FIG. 24 illustrates two display images of a local executable application, and a single display image of an administrative application of the disclosure, illustrating support and grievance reporting and administration;

FIG. 25 illustrates three display images of a banking system application of the disclosure;

FIG. 26 illustrates a screen image of music playing software of the disclosure;

FIG. 28 depicts a display generated by an admin app of the disclosure, for administrating email;

FIG. 29 depicts a screen image generated by the admin app of FIG. 28, for approval of digital content; and FIG. 30 depicts a screen image generated by the admin app of FIG. 28, illustrating a disposition of digital content.

DETAILED DESCRIPTION OF THE INVENTION

Figure 1:
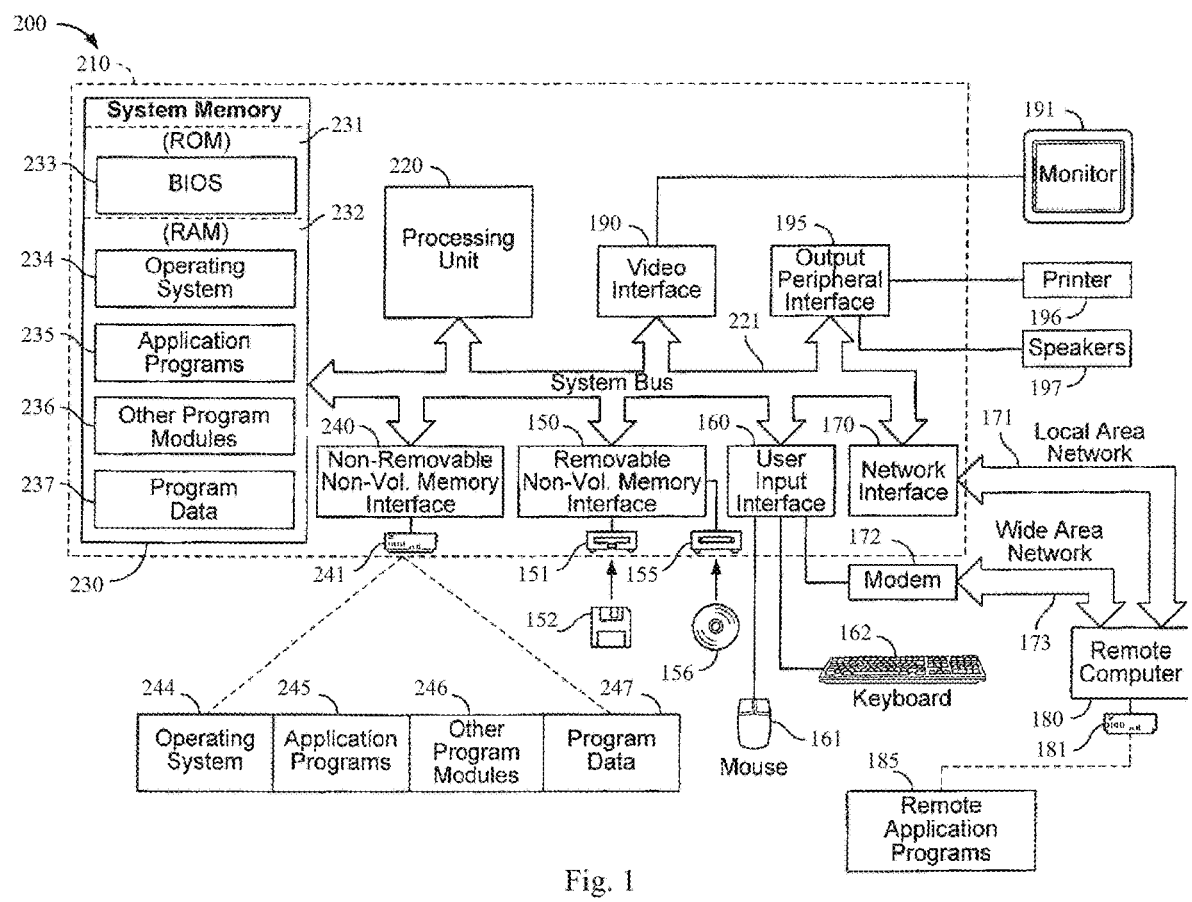
FIG. 1 illustrates an exemplary computing environment that may be used to implement a server in accordance with an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

In accordance with the disclosure, a system and method for reducing inmate mail costs, eliminating the problems associated with an inmate's conventional physical address, improving delivery speed, eliminating drug and forbidden substance smuggling, and allowing better recordkeeping of incoming packages is provided.

This description and the annexed drawings set forth in detail certain illustrative aspects of the invention. These aspects are indicative, however, of but a few of the various ways in which the principles of the disclosure may be employed, and the present disclosure is intended to include all such aspects and their equivalents. Other advantages and novel features of the invention will become apparent from the following detailed description of the invention when considered in conjunction with the drawings.

In accordance with one aspect of the disclosure, one or more databases, residing in one or more servers, may be used as repositories of electronic data to be delivered to individuals, for example inmates, in a constrained environment and/or restricted-access location, such as a jail, prison, or other correctional facility. One aspect of the invention involves delivering and monitoring electronic letters to correctional facility inmates while giving supervisory authorities the ability to screen the incoming mail. This may be achieved by providing a database having an entry for each inmate and having a plurality of fields, wherein the fields include inmate name, correction system identification code, inmate identification code, correction system facility code, wherein the facility code maps to a specific corrections facility; and by scanning an original letter to produce an electronic letter and storing each electronic letter sent to a specific inmate in a relational database management system (RDMS) table, wherein the RDMS table includes fields for inmate name, inmate identification number and lists of corrections facilities.

In another aspect of the disclosure, a computer-operated kiosk, such as a walk-up or other workstation for multiperson use, may be used by individuals (e.g., inmates) in a restrained environment/restricted-access location (e.g., a prison) to browse through a catalog of available digital media, such as music, to compose outgoing mail, to conduct video visitation, or to create prerecorded videograms, all as described further herein. They may purchase the digital media, for example, with credits earned based on work performed, or bought through some other means, for example with money deposited by family members of the inmate. The kiosk may include means for limiting access to the operating system or other modules in the kiosk computer so that inmates are blocked from accessing other machines with sensitive information that may be connected to the kiosk computer. After the user has browsed the catalog of digital content or media, selected the desired content (e.g., songs) and paid for the same, the purchased content may be downloaded to a digital content player device. The digital content player device may also be used to display digital media of any type, including digital correspondence, to inmates.

The present disclosure may be implemented in one or more servers, one or more client devices, including computer terminals or portable client devices, or a combination thereof. The data to be accessed by end users in a restrained environment may be stored in one or more databases.

An exemplary computing device for implementing a server is illustrated in FIG. 1. For example, the computing environment illustrated in FIG. 1 may be used to implement a database server, an email server, a DNS server, a POP/IMAP server, a digital fulfillment server, a media server, a local server, a global server, etc.

FIG. 1 illustrates an example of a suitable computing system environment 200 on which features of the disclosure may be implemented. The computing system environment 200 is only one example of a suitable computing environment and is not intended to suggest any limitation as to the scope of use or functionality of the disclosure. Neither should the computing environment 200 be interpreted as having any requirement relating to any one or combination of components illustrated in the exemplary operating environment 200.

The disclosure is operational with numerous other computing system environments or configurations. Examples of well known computing systems, environments, and/or configurations that may be suitable for use with the disclosure include, but are not limited to, personal computers, server computers, hand-held or laptop devices, smartphones, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computing devices. Generally, program modules include routines, programs, objects, components, data structures, etc., that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system that may be used for implementing the disclosure includes a computing device 210 which may be used for implementing a server. Components of computing device 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 typically includes a variety of computer readable media. Computer readable media may be defined as any available media that can be accessed by computing device 210 and includes both volatile and nonvolatile media, removable and non-removable media. By way of example, and not limitation, computer readable media may include computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 210. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computing device 210, such as during start-up, is typically stored in ROM 231. RAM 232 typically contains data and/or program modules that are immediately accessible to and/or presently being operated on by processing unit 220. By way of example, and not limitation, FIG. 1 illustrates operating system 234, application programs 235, other program modules 236, and program data 237.

The computing device 210 may also include other removable/non-removable, volatile/nonvolatile computer storage media. By way of example only, FIG. 1 illustrates a hard disk drive 240 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 210. In FIG. 1, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 220 through a user input interface 160 that is coupled to the system bus, but may be connected by other interface and bus structures, such as a parallel port, game port or a universal serial bus (USB). A monitor 191 or other type of display device may also be connected to the system bus 221 via an interface, such as a video interface 190. In addition to the monitor, computers may also include other peripheral output devices such as speakers 197 and printer 196, which may be connected through an output peripheral interface 195.

The computing device 210 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computing device 210, although only a memory storage device 181 has been illustrated in FIG. 1. In one embodiment of the present disclosure this computer 180 may be used to implement a kiosk for delivering digital media to an inmate or as a terminal for displaying correspondence to an inmate. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing device 210 is connected to the LAN 171 through a network interface or adapter 170. When used in a WAN networking environment, the computer 210 typically includes a modem 172 or other means for establishing communications over the WAN 173, such as the Internet. The modem 172, which may be internal or external, may be connected to the system bus 221 via the user input interface 160, or other appropriate mechanism. In a networked environment, program modules depicted relative to the computing device 210, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present disclosure includes one or more databases, residing in one or more servers, which may be used as repositories of electronic data to be delivered to individuals in a restrained environment and/or restricted-access location, such as inmates. In general, a typical database is an organized collection of information structured such that a computer program, for example, can quickly search and select data. Traditionally, data stored within a database is organized via one or more tables, wherein respective tables comprise sets of records and a record comprises a set of fields. Records are commonly indexed as rows within a table and the record fields are commonly indexed as columns such that a row/column pair can reference particular datum within a table.

The database systems in accordance with embodiments of the present disclosure are not limited to relational database systems and organizing information in tables, although the disclosure will be described with respect to the usage of tables. For example, a database system in accordance with the present disclosure may generally store data in one or more data containers, each container potentially including one or more records, and the data within each record potentially being organized into one or more fields. In the context of relational database systems, these containers may be referred to as tables, the records may be referred to as rows, and the fields may be referred to as columns. In the context of object oriented databases, the data containers may be referred to as object classes, the records may be referred to as objects, and the fields may be referred to as attributes. A person of ordinary skill in the art would recognize that other database architectures may use other terminology.

For the purpose of explanation of the disclosure, the examples and the terminology used herein shall be that typically associated with relational databases. Thus, the terms "table", "row" and "column" shall be used herein to refer respectively to the data container, record, and field. The present disclosure is not limited to any particular type of data container or database architecture.

A database server, in accordance with the present disclosure, retrieves and manipulates data in response to receiving a database statement conforming to a database language, such as for example, Structured Query Language (SQL). The database statement may specify a query operation, a data manipulation operation, or a combination thereof. A database statement that specifies a query operation is referred to herein as a query. The present disclosure is not limited to database statements that specify a particular type of operation. Database security mechanisms to restrict or expand access to a database have been described in U.S. Pat. No. 7,346,617 to Wong, incorporated herein by reference, and U.S. Pat. No. 7,661,141 to Dutta et al., incorporated herein by reference. One function of a database server in accordance with the present disclosure is to control access to database data.

Figure 2:
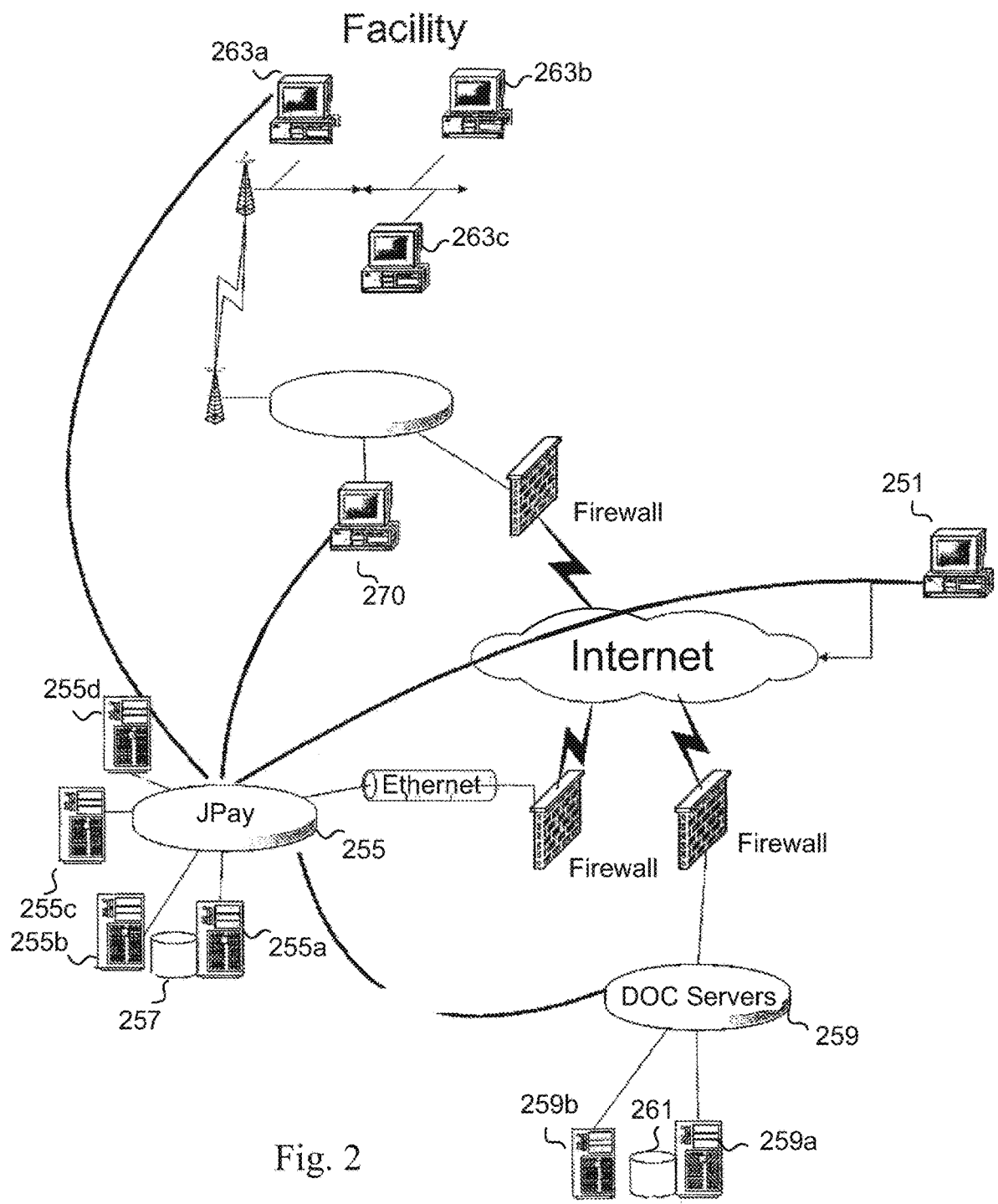
FIG. 2 illustrates a system in for routing electronic correspondence accordance with one embodiment of the present invention.

FIG. 2 illustrates a system in accordance with one embodiment of the present disclosure for routing electronic correspondence, such as letters and mail, to correction facility inmates that eliminates the delays, costs and risks associated with the current correction facility paper or hard copy mail system. The system and method of the disclosure routes letters and other digital correspondence by using, for example, a table in database 257 that indicates the inmate's name, correction system code, inmate identification code and facility location code. Correctional facility staff can print the digital content using a printing device connected to a computer, or can view the digital content using an electronic display device such as a personal computer or a visual display terminal (263a, 263b, 263c), while enabling supervisors to screen the incoming digital content using a computer terminal 270. One or more walk-up kiosks or terminals 263a, 263b can be provided for inmates to access preapproved digital content.

Aspects of one embodiment of the present disclosure may include providing a database 257 having an entry for each inmate and having a plurality of fields, with the fields in turn including inmate names, correction system identification codes, inmate identification codes, correction system facility codes which indicates a specific correction facility; and storing each electronic letter sent to a specific inmate in a relational database management system (RDMS) table, the RDMS table including fields for inmate name, inmate identification code and lists of corrections facilities. The database 257 may also include a table that includes entries for all inmates in a correction system or a correction facility.

The database may be maintained by periodically downloading a file from the correction authority central computer server farm 259 (including, for example, servers 259a-b) for such changes as new inmates, inmate releases and inmate movement between facilities. In one embodiment of the present disclosure, the downloading step is performed daily and the database may be arranged to provide for correction authority letter search and retrieval by the inmate name, inmate identification code, date, facility or keyword. In one embodiment, the database table includes at least three fields selected from the following group: (1) an inmate's last name, (2) an inmate's first name (3) an inmate's identification code, (4) an inmate's correction system code, (5) an inmate's correction system facility code and (6) other information if needed.

The present disclosure includes a letter creation and transmission website that may be maintained by server farm 255 (including, for example, servers 255a-d and database 257) that can be used by a person desiring to write letters to an inmate and that optionally assesses a fee for each letter sent. The website may be configured so that the writer can store and review his or her letter drafts digitally. The writer may receive email notification at computer 251 when his or her letter has been printed in the inmate's facility and delivered to the inmate and/or viewed by the inmate through a computer terminal (e.g., 263a, b, c) at the inmate facility, or viewed through a digital content player, such as a handheld device designed to be sufficiently small, and configured, to be held and operated using one hand of a user. In an alternative embodiment, the writer may scan the desired correspondence or document through use of a scanner and upload the scanned document to the website for forwarding to the inmate. In yet another alternative embodiment, a message delivered to an inmate may include photos or videograms attached thereto, which may be displayed at a kiosk or digital content player at the inmate's facility. Conversely, an inmate may use a kiosk or digital content player to create outbound messages directed to family members, for example, and distributed through use of the communications architecture of the present disclosure.

Aspects of another embodiment of the present disclosure include (a) providing, in database 257, one or more tables having a plurality of fields, with the plurality of fields including at least two fields selected from a group consisting of inmate name, inmate identification code or other identifier, and inmate facility name or facility code; (b) providing an electronic interface accessed through computer 251 for a writer, wherein the electronic interface allows the writer to specify the inmate or inmates that are the intended recipient(s) of the writer's communication, space for text of the mail or correspondence; and (c) a system enabled by server farm 255 for purchasing "postage" to transmit the mail or correspondence; and maintaining a database table, the database table including (i) a list of letters sent by a specific writer, (ii) a list of letters that the inmate has received, and (iii) a list of privileged writers. The database table may also include a table entry indicating whether that letter has been previously read by the correction authorities and by whom; a table entry indicating which letters have as yet not been reviewed; and/or a table entry indicating who has been using the process to send letters to which inmates and at which facilities.

The database table may also include a table entry allowing authorities to search scanned letters for certain keywords.

The database table can further comprise a table entry indicating privileged writers, such as attorneys, whose communications may be marked as privileged when printed or displayed and whose letters will be marked as not for correction authority inspection. The database table can further comprise a table entry indicating keywords that are of interest to the correction authorities. The database table can further comprise a table entry indicating to whom each writer is sending letters.

The system of the disclosure and method provides an electronic letter routing software system that can be implemented on a network, including the Internet. Routing of mail is described in U.S. Pat. No. 7,647,380 to Gillum et al. which is incorporated herein by reference. In an embodiment of the system and method of the disclosure, several database tables are created in database 257, including but not limited to: an inmate table that identifies the inmates and related information; a facility table that identifies the facilities and related information; a writer table that identifies the writers and related information; a credit card table that identifies the credit cards that the writer uses; a letter table that identifies the letters and related information; a privileged writer table that identifies the writer as a privilege communicator; and a keyword table that lists the keywords of concern to the prison authorities.

Inmate Location

The system of the disclosure and method creates, via regular downloads from the correction authorities' database (e.g., 261) associated with a correction authority's central computer (e.g., 259*a, b*), a table that includes inmate names, correction system identification codes, inmate identification codes, correction system facility codes, and optionally other information.

The correction system identification code uniquely identifies a particular correction system such as a state, county or federal system. The inmate identification code uniquely identifies a particular inmate within a particular correction system such as a state, county or federal system. The correction system facility code uniquely identifies the correction facility within the correction system that holds that particular inmate. This facility code thereby determines which letters will be placed into that facility's mail file during the next mail delivery (or download).

Inmate Location

The system of the disclosure encodes the correction facility internally, for example as a four character sequence, where the first two characters identify the state and the second two characters identify the facility within that state. As a non-limiting example, New York's Dannemora prison is coded as "NYDA" while the Federal government's prison at Danbury, Conn. is coded as "FDDA". The facility code can be case insensitive. Such an encoding scheme allows for 1,296 (36 squared (letters A-Z number 0-9) facilities within a corrections system (e.g., AA through 99).

An inmate table can include the following fields in a database: inmate's last name; inmate's first name; inmate's identification code; inmate's correction system state, county or federal code; inmate's correction system facility code; and other information if needed, such as device ID for the digital content player.

Facility Setup

A facility is added to the system of the disclosure via an input screen. Input data requested can include, but is not limited to, facility code, facility name, mail delivery times and other information if needed. Advantageously, the facility location is further included, or the inmate location (i.e., cell block) within a particular facility.

The system of the disclosure then performs validity checks. Such validity checks may include, for example, determining if the facility is already in the table. If the data are valid the facility is added to the database table.

The Facility Table

A facility table comprises at least one field selected from the group including: a four (4) character alphanumeric facility identifier, the facility name, the facility address, facility mail delivery times, and other information if needed.

Writer Registration

Before sending an initial letter, a writer first opens an account by filling out an input form that requires data, such as a username, a password and an optional email address. A password system can be used to further let the writer enter a hint question so that if he forgets his password he can be reminded. For example, the writer might enter a password of "lion" and have a question to remind him of that password that asks, "What is my favorite animal?"

The process or software then performs various validity checks (such as email verification or credit card verification with name and address). If a writer proves to be a valid writer, the writer is added to the writer table and assigned a unique identification number.

The Writer Table

The writer table comprises at least one field selected from the group including: writer's username; writer's password; writer's password hint; writer's email address (optional); writer (system assigned) unique identifier; and amount of postage writer has remaining.

Purchasing "Postage"

In order to send a letter the writer buys "postage" by entering his or her credit card information. The amount of the postage is stored in the writer's table. The process creates a unique credit card/username identifier for each writer.

The Credit Card Table

The Credit Card table includes: writer unique identifier card name (e.g. VISA, MASTERCARD, AMEX, etc. . . . ); card number expiration; unique credit card/username identifier; and unique credit card validation number.

Billing Records

The billing table displays the amount and date of postage purchased on that credit card.

The Billing Table can include: unique credit card identifier, transaction date, and transaction amount.

It should be understood that the field descriptions provided herein, for the various tables, are exemplary, and can be used to carry out the disclosure. Additional or fewer fields may be used, and the field names may be different.

Sending Letters

To compose a letter the writer uses a letter-input screen. This screen can resemble a standard letter with the writer's address on the upper right and recipient's address on the lower left, for example. The writer can insert the inmate's address into the letter in different ways, as follows. In one embodiment, the writer can select the name of one or more recipients using a Recipient Table, presented for example in the form of a dropdown list.

First, the writer can identify the inmate's corrections system. If the inmate is incarcerated in New York, for example, the writer can specify that state by typing NY or by using a "pull down" menu. The writer can then enter the inmate's identification code, and the inmate's name and address will automatically fill in.

Alternatively, the writer can address the letter by entering the inmate's last name. If several inmates share that last name, the system will list all inmates with that last name, their first names, their inmate identification codes, and their facility locations. The writer then selects the correct inmate, and the address automatically fills in.

The writer can then enters the text of the letter, and click the send button. The letter is added to the letter table, and the writer is informed of the next mail delivery. The writer may then exit the process, or write another letter.

Storing the Letters

The inmate letters are stored on the server 255. The status of each letter is also stored. Such status indicates whether the letter has already been downloaded and read, whether the letter should be held for review, and which keywords may have been detected.

In an exemplary embodiment, fields include: a unique inmate identifier; a unique writer identifier; a facility code; the time and date the letter was created; the time and date the letter was delivered; correction review (yes/no); a hold/release flag; keyword triggers; and the text of the letter.

Writer Interaction

The writer interaction process includes a screen that enables the writer to review his activity. First, the writer can see a detailed list of the inmates to whom he has sent letters. Second, the writer can see a list of the letters that he has sent to a particular inmate. Third, the writer can read a letter that he has previously sent.

Corrections Authorities—Getting the Mail

The facility mail file may be stored on the server and may be retrieved by the facility mailroom. Alternatively, the file may be emailed to the facility.

In one embodiment, facility mailroom employees retrieve the mail file via a web page that allows them to create the mail file dynamically from the letter table. The mailroom employee enters name and password. Thereupon, to create the mail file, the process creates a list of letters for that facility in preferred order (e.g. alphabetized by inmate name), and a cover sheet listing the letters. The process then creates a download file that includes the cover sheet followed by the letters in the specified or preferred order.

Once the download is completed, the letter table is updated to indicate that the letters have been downloaded at the facility. The writers are then emailed that the letters have been printed.

Correction Authorities Interaction

Correction authorities read inmate mail, except for privileged correspondence, for example between an attorney and his or her (inmate) client. First, correction authorities can see a chronological list of letters sent to the inmate and can print inmates' letters either individually or collectively. Second, correction authorities are alerted if inmate letters contain prohibited keywords. Third, correction authorities can read letters and indicate in the letter table that a particular letter has been reviewed and if held for review subsequently released to the inmate. Fourth, correction authorities can search across all inmate letters in the correction system for commonalities and keywords.

Delivery of Digital Content

Figure 3:
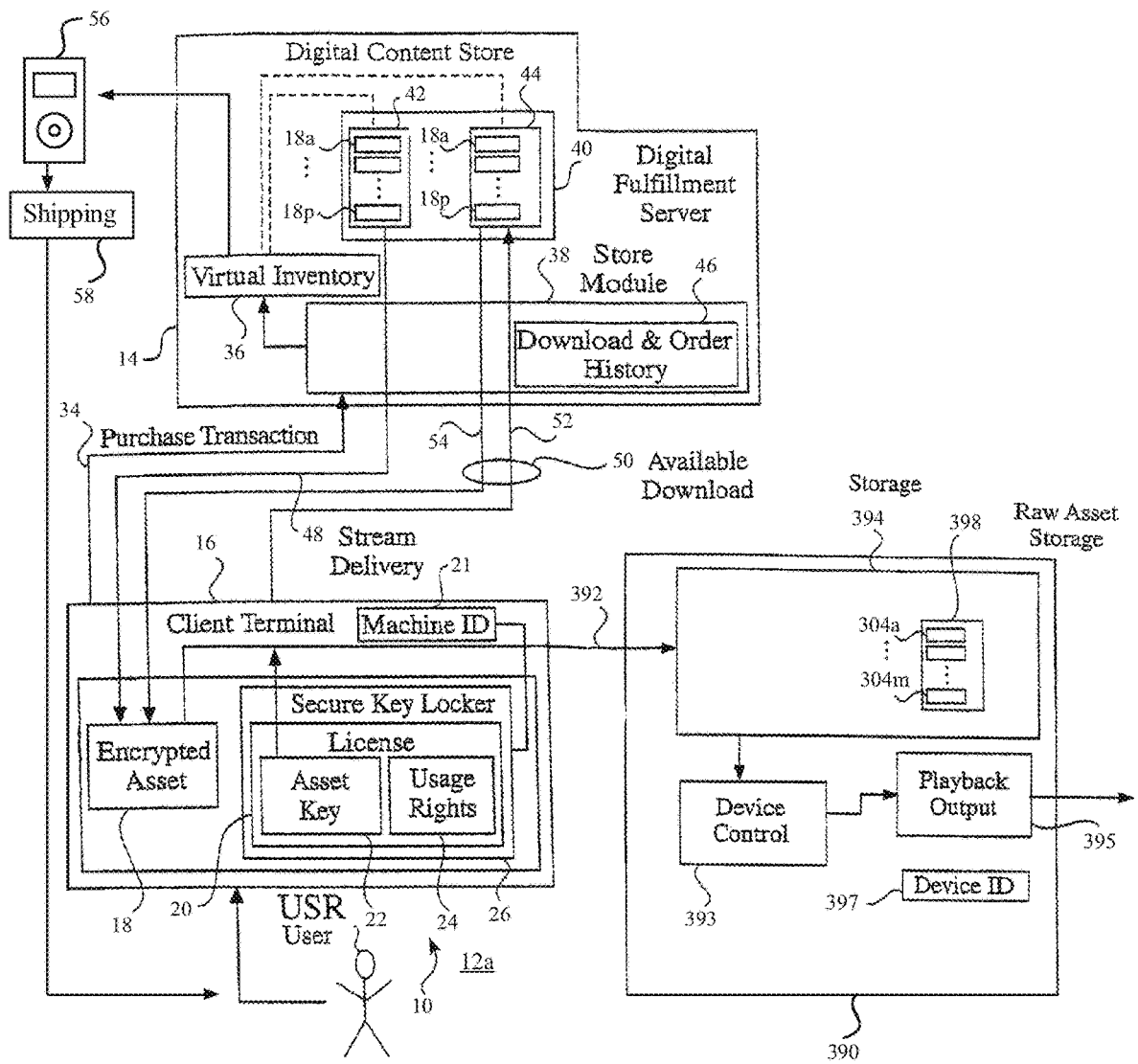
FIG. 3 illustrates a communications environment which may be used to deliver digital content in accordance with one embodiment of the present invention.
Figure 4:
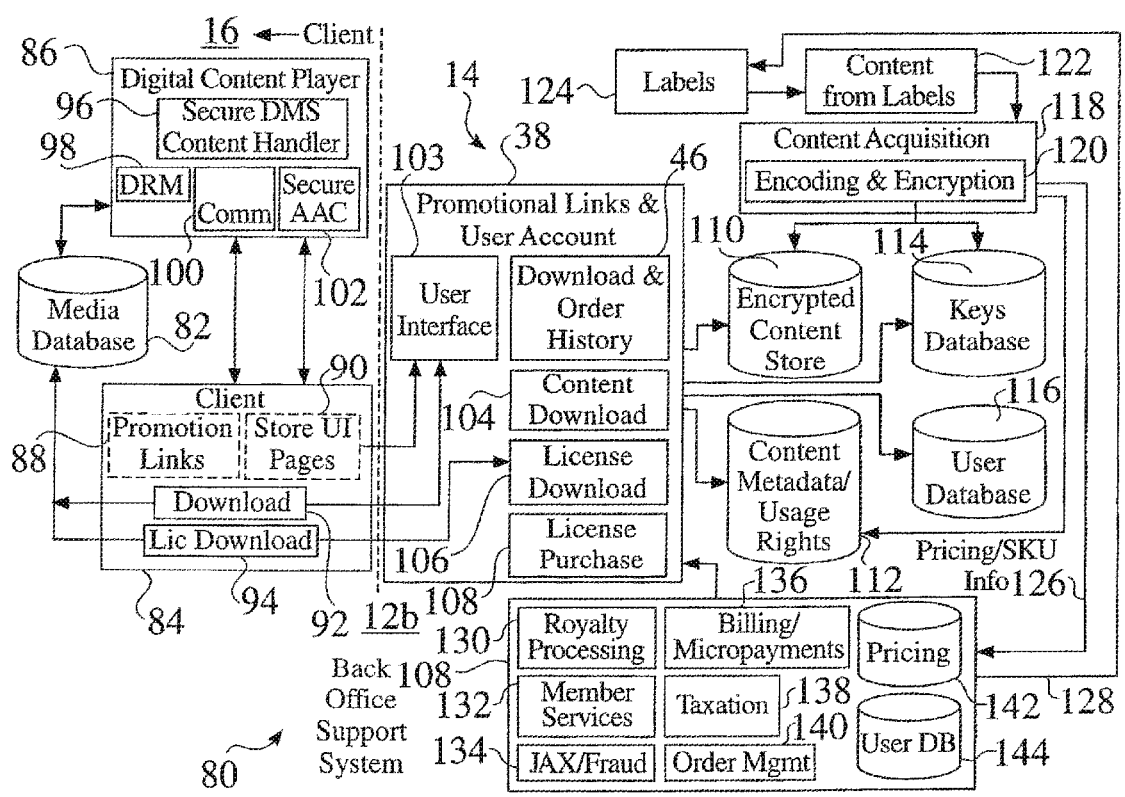
FIG. 4 illustrates a client and server architecture that may be used to implement a digital content store system in accordance with one embodiment of the present invention.

Another embodiment of the present disclosure includes the delivery of digital content, such as music or video content, videograms (prerecorded video messages or other user generated content), and video visitation (video streaming, one or two-way), to inmates. FIG. 3 illustrates a communications environment, parts of which may be used in the implementation of the digital content delivery aspect of the present disclosure. FIG. 3 is a basic schematic diagram 10 of a digital content store system 12*a* implemented between a digital content store 14 and a client machine 16. A user USR at a client machine 16 may access the digital content store 14 through a store link and account module 38, such as through a user interface 103 (FIG. 4). The store module 38 is typically associated with a selectable inventory 36 of assets (e.g., songs), which are typically accessible 42, 44, upon purchase or other redemption, as encrypted assets 18, e.g., 18*a*-18*p*, such as through a digital fulfillment center 40. The content store 14 may also maintain a history of ordered and downloaded assets 46.

A user USR at a client machine 16 may purchase encrypted assets 18 (e.g., encrypted songs), through the entry of purchase information 34, whereby the encrypted assets 18 are delivered, such as through downloading 50, which may include a download prompt 52 and download delivery 54, wherein the download delivery 54 comprises both asset delivery and license delivery to the client 16. In another embodiment of the present disclosure the assets need not be encrypted.

In some system embodiments 12, the user USR may also use the system to purchase physical inventory of content 56, e.g., an MP3 player pre-loaded with songs, which are then shipped 58 to the intended user USR. Upon purchase 34, some system embodiments comprise both delivery of physical content 56, along with downloading of encrypted digital content 18, whereby the intended user USR can quickly access content 18, such as songs, movies, games, or other content 18.

As seen in FIG. 3, license information 20 for an encrypted asset 18 includes the asset rights for the encrypted content 18, and may include both an asset key 22 and usage rights 24, which are retained within a secure key locker 26. In one embodiment, the asset key 22 is bound to the client machine 16, such as through machine fingerprinting or in conjunction with the machine identification 21.

Usage of the encrypted asset 18 typically includes writing or uploading 392 the asset 18 and license information (e.g., key 22 and usage rights 24) to a digital content player 390. The digital content player includes a device control 393 module to direct the operations of the player 390, a unique device ID 397, and a module 395 for outputting content in a format that can be played or further modified such that a user can perceive. The player 390 may also include the capabilities of decrypting the assets and moving the raw assets 304 to a raw asset storage area 398 within the player's memory 394.

The player may also store encrypted assets in memory 394 and playback the encrypted assets 18 by retrieving the asset rights 20, whereby the asset key 22 operates upon the asset 18, such as through decryption, decoding and/or rendering. The enabled asset is then played as desired by the user USR, in compliance with the usage rights 24.

An authorized use of the encrypted asset 18 may include an authorized transfer 29 of the asset 18 to media or storage on a player 390, e.g., an MP3 player, or to another machine 16, as allowed by usage rights 24. In conjunction with an authorized transfer 392, a modified license 20 may be included with the encrypted asset 18, such as comprising an asset key 22 which is unbound from the primary client machine 16, and a portion of appropriate usage rights 24, e.g., such as for authorizing use of physical media 56.

FIG. 4 is a detailed schematic diagram of client and server side architecture within a digital content store system 12*b*. This environment or parts thereof may be used to implement certain features of the present disclosure. Client software 84 provides communication functionality to server 14, and to a digital content player 86, e.g., a music player. A media database 82 may reside in the client computer and may store assets, such as acquired encrypted assets 18, and may be used to store other assets, such as unencrypted assets and/or associated metadata.

The client software 84 typically comprises a download module 92, a license download module 94, and may also comprise other functionality, such as stored user interface pages 90 and/or promotional links 88, e.g., for a digital content store 14.

The digital content player 86 may include a secure digital content/music store (DMS) content handler 96, digital rights management (DRM) 98, dedicated communications module 100, and secure advanced audio coding (AAC) 102.

On the server side 14, promotional links and user account 38 typically comprise a user interface 103, download and order history 46, content download 104, license download 106, and license purchase 108. An encrypted content store 110 stores encrypted content 18, such as is available for purchase within the digital content store system 12. Other server storage comprises content metadata and usage rights 112, keys database 114, and a user database 116.

As seen in FIG. 4, raw content 122, such as from labels 124, is sent to content acquisition 118, wherein the incoming raw content 122, which may include raw assets and associated metadata, may be processed within an encoding and encryption module 120.

The back office support system 108 shown in FIG. 4 comprises pricing 142, a user database 144, royalty processing 130, member services 132, billing and micropayments 136, taxation 138, order management 140, and jax/fraud 134. Pricing/SKU information 126 is typically sent to the back office support system 108, such as from metadata 306 received at content acquisition 118. As well, royalty reporting or other output information 128 is typically sent from the back office support system 108 to the labels 124.

As seen in FIG. 4, content and associated license information is sent from the server 14 to the client machine 16, through the client software 84. Encrypted content 18 is transferred to the media database 82, where it is retrievable for usage through the digital content player 86. As needed, the digital content player 86 may interact through the client software 84, such as to communicate with the server 14, e.g., to update usage information, or to prompt the user USR to acquire or extend asset rights 20.

During playback of acquired assets, the digital content player playback engine extracts the asset key 22 from the secure key locker 26, and then decrypts, decodes, and renders the asset 18. The media pipeline is protected up until the handoff to the sound card.

If the digital content player 86 detects that the key 22 is missing, or is not valid for the machine 16 in question, the digital content player 86 may first play a sample of the song 18, e.g., such as a 30 second clip, and then the digital content player 86 presents the user USR with a purchase opportunity. If the user USR chooses to purchase 34, the user is taken to the digital music store 14 to complete the process 34. The entire key mechanism is advantageously seamless to the user experience.

Figure 5:
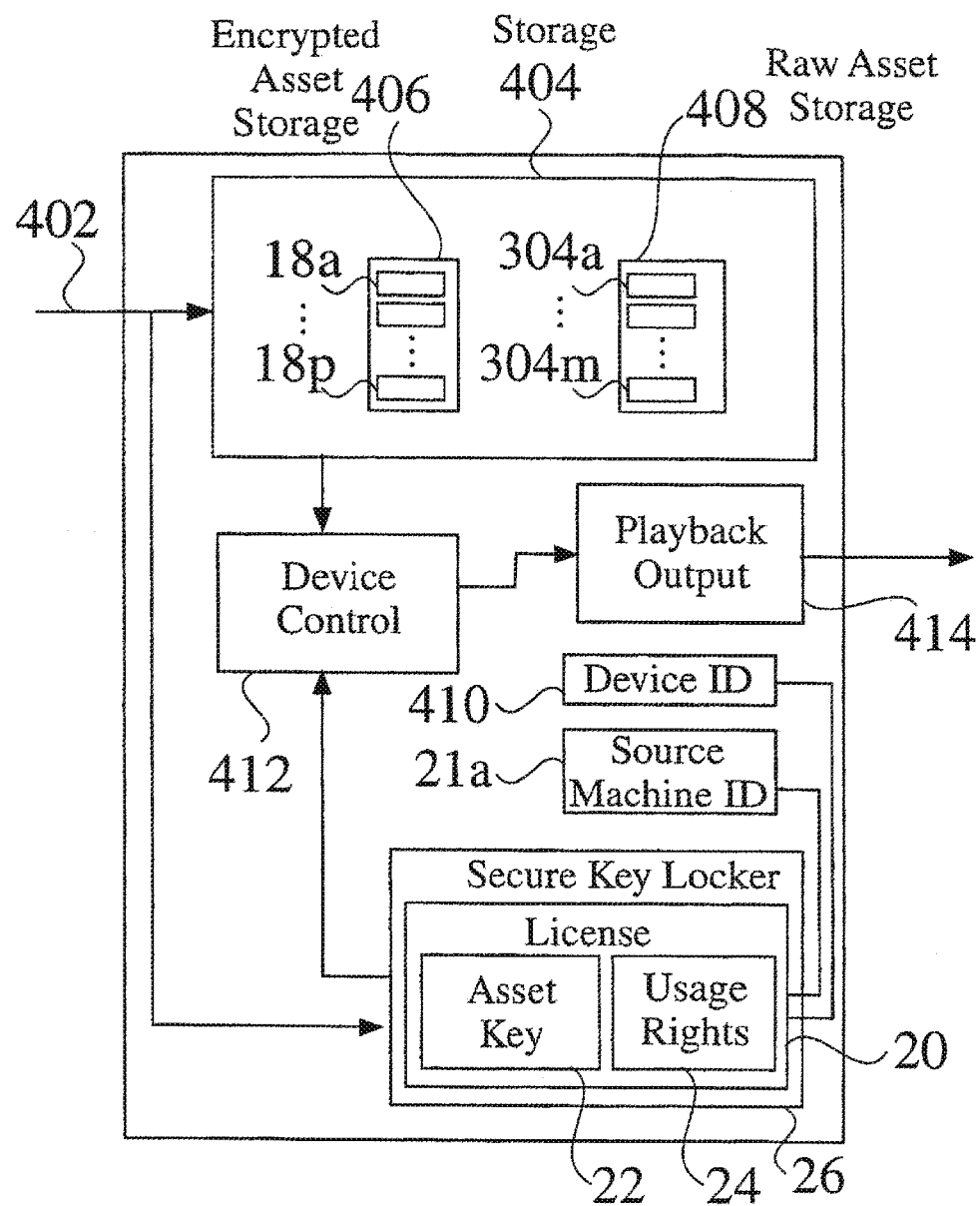
FIG. 5 illustrates a functional block diagram of a digital music player.

FIG. 5 is a functional block diagram of an alternative digital music player 400 including asset security for encrypted assets 18. Encrypted content 18a-18p is typically transferred from a client machine 16, in compliance with allowed usage rights 24. Some embodiments of the player 400 additionally provide storage and playback of raw, i.e., unencrypted assets 304a-304m. As seen in FIG. 4, the player 400 typically comprises similar internal digital rights management capabilities, such as a secure key locker 26, and an extended license 20, comprising asset keys 22 and usage rights 24 for the encrypted content 18. The player may typically store one or more device IDs 21, to track the source machine 16 from which content 18 is received. The device may also include a device ID 410, which is used for machine-bound content management. In some embodiments of the secure content player 400, the player 400 is considered to be a client machine 16, such as for licensing purposes. The player 400 may be considered to be an independent player, such as for licensed usage allowed for a user USR of one or more client machines 16.

Figure 6:
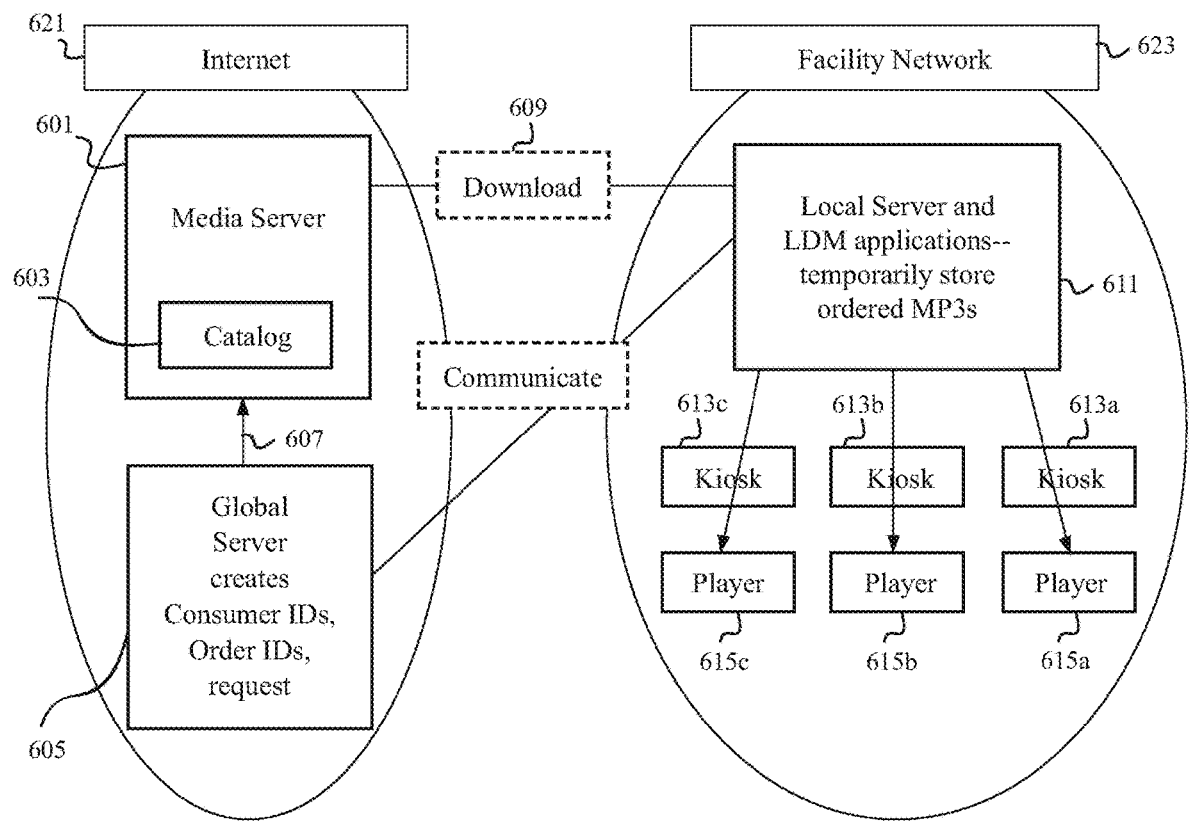
FIG. 6 illustrates a system for delivery of digital content in accordance with one embodiment of the present invention.

The system and method of the present disclosure allow inmates to buy digital media, including individual songs, albums and eBooks, from an Inmate Kiosk and download it to a personal portable player of digital content (the "Player") securely while ensuring the protection of content owner rights. The system of the present disclosure in accordance with one embodiment (FIG. 6) may include the following components:

Global Server 605: Administers services to an online store running in server 601 and eCommerce over the Internet 621.

Inmate Kiosks 613a-c: Allow inmates to securely interact with local server 611 over a secure facility network 623. In one embodiment, the kiosk terminals 613a-c do not allow localized storage or access to regular Windows-level folders. Each kiosk terminal may run a kiosk application to prevent the inmates from treating the terminal as a regular PC with OS access. The kiosk application ensures that the kiosk is solely used as a window into the local server 611 and local download manager (installed in the server 611) and only connects to the web for specific pre-approved functions within the media store (run by server 605), such as listening to song previews from the content provider's server 601. Software specifically designed to prevent tampering, for example accessing the operating system, is advantageously used in combination with software of the disclosure. Alternatively, such service is included in software of the disclosure.

Local download manager ("LDM"): This application may run on the Local Server 611 and administers the synchronization of media delivery between the Global Server 605, Inmate Kiosk (e.g., 613a), and a Player (e.g., 615a). Content resides on the Local Server 611 and LDM, which is then delivered to Player 615a-c through the corresponding kiosks 613a-c.

Digital Content Player (or Player): The portable digital content player may be purchased by an inmate. An inmate synchs the Player and downloads files securely through a kiosk after purchase of content using a personal account created and maintained at the Global Server 605. The Player may be implemented as a custom-made device for the corrections industry that allows delivery only of approved content via specific USB codes which prevent unauthorized connections. All inmate interaction with the Global Server 605 and the Media Server 601 is conducted using a unique inmate ID to ensure security and prevent cross-pollination or abuse of account information or purchased media.

In one embodiment of the disclosure, the digital content includes music and may be maintained in a catalog 601 by a content aggregator (specializing in obtaining licensing for large catalogs of digital content) at a Media server 601. In an alternative embodiment the system administrator for server 605 may also administer the media server 601. In another embodiment of the disclosure, the player displays inmate correspondence.

In one embodiment, the content aggregator obtains the content from the different music labels to update the catalog 603 and uniformly funnels the content catalog over the Internet to the Global Server 605 as XML files. The Server 605 loads the catalog 603 from the MEDIA SEVER 601 and processes it to fit any general or specific restrictions. The catalog may include links to previews and album art which reside on the Aggregator's site at all times and are provided through a direct link from the kiosk.

The Global Server 605 may get daily updates to the catalog from the media server 601 using SOAP API. To purchase a song from the Aggregator, the Global Server 605 also may use SOAP API. After a purchase is made, the Global Server 605 sends download instructions to the local server 611 to download the songs. The inmate then connects to the kiosk which in turn copies the files from the local server 611 to the digital content player.

The Local Download Manager (LDM) may be implemented as a standalone executable used to manage the content downloads between the Local Server 611 and Players 615a-c (using the kiosks 613a-c as enabling pass-through units). In one embodiment, the LDM centralizes management of all tasks, for example content downloads, local storage, etc., in one location per inmate facility, and the Local Server 611 runs separately and is not physically accessible to inmates. The LDM may include predefined settings which provide general information about the Aggregator's site (URL, user name, password etc.). The LDM transfers information about processed orders into a file system in the local server 611 before a content download begins. The order for content contains inmate ID, song name, and access instructions. Each completed delivery of content to the Player is reported back to the Global Server 605 and the Local Server 611 and stored on a file system locally at Local Server 611. The kiosk deletes the content file copy from the local server 611 after it is transferred from the local server network drive directly to the Player (i.e., after successfully copying the files to the digital content player).

In one embodiment of the present disclosure, the LDM communicates with the global server 605 over Web Services and LDM acts as the client (e.g., LDM will pull information from global server 605). The LDM may be accessed through a management console with HTTP based user interface ("UI") and may also have a local text based log file to describe main actions.

The LDM may obtain specific downloaded instructions from the Global Server 605. Local Server 611 downloads the content from the media server 601, stores the content on its local file system, and provides the kiosk access to the stored content to retrieve songs, for example, and deliver them onto the Player. Each inmate may have a directory on the local file system with subdirectories for downloads and galleries and can only access his or her own account.

In one embodiment of the present disclosure, a kiosk terminal 613 has pre-defined settings to access the local server 611 file system root directory using a share drive mechanism. The local server 611 notifies the kiosk 613 when content is ready to be downloaded to the player 615, after which the inmate will able allowed to start downloading media directly to a registered Player. The Player may connect to the kiosk through a standard USB port.

After connecting the player to the kiosk, the kiosk identifies the player, for example, based on the inmate id or other identification parameters embedded in the player during the fulfillment process. Unrecognized players/devices are not immediately served. When the kiosk matches the inmate id to the Player and session id, the player is allowed to download content. At the start of the download, the kiosk accesses the inmate directory on the local server file system and copies all new files in this directory directly to the Player (one-way synch process). Download includes copy or, if configured, moves the content files from the inmate folder on the LDM directory to the player. In one embodiment, files will not be saved on the kiosk file system. Advantageously, the player should not be disconnected from the kiosk while downloading content. The kiosk may display a message to the inmate such as "Downloading, do not disconnect." The Kiosk application disables an auto logout feature during download and resumes when the download is complete.

After download of content is complete the following can occur: (1) a summary message is displayed to the inmate (songs, price, etc); (2) a status change notification of a completed download is sent to the local server; and (3) the kiosk application collects the player's statistics (number of songs and available space) and sends it back to the local server.

When the kiosk is in the process of authenticating an inmate, if the kiosk does not match the inmate id to the Player and session id, the kiosk can stop serving the player and perform the following actions: (1) the kiosk sends a notification back to the local server 611 to be propagated to the appropriate facility user—this prevents the inmate from continuing to use the unauthorized device by either moving all songs from the player to the inmate directory on the LDM or disabling the Player; and (2) the kiosk displays a message to the user and marks his account as "Locked."

In addition to facilitating the downloading of content into the player, the kiosk application is responsible for the Player maintenance and control, in accordance with one embodiment of the disclosure. Each Player is registered to one inmate and includes a unique ID to be matched with a specific inmate ID. Each kiosk can only access the inmate's account on the Local Server 611.

Player access to the kiosks may be restricted by "burning" an individual inmate ID into the player device's memory. In one embodiment, the kiosk allows downloads for inmates that authenticate themselves at the kiosk and then connect a Player with a matching ID. If the Player is NOT verified the kiosk sends a "lock" command to the Player to prevent further use.

In one embodiment of the disclosure, there are two specific methods of communication with the Player. In a first method of communication, a specific driver allows interaction between the kiosk and the player only if the driver is loaded to the kiosk terminal (this eliminates unauthorized PC connections). The "mass-storage" capabilities may be excluded from the driver to eliminate the risk of using the player as a flash drive. In one embodiment of the disclosure, the driver allows the player and player software to communicate with the kiosk application, so if the driver is not loaded the player cannot communicate with the kiosk.

In a second method of communication between the kiosk and the player, a .COM object or .NET assembly is loaded in real-time by the kiosk application or software library and is compiled to the kiosk application with the following functions:

Int GetInmateID (string PassKey)—return inmate id or −1 if wrong passkey or inmate id is not available. Passkey may be defined as a predefined string used for security purposes. Int PutInmateID (string PassKey, string id)—store a new id on the device. Bool ChangePassKey (string currenPassKey, string newPassKey)—change the passkey. Int GetDevice serialID (string PassKey)—get a unique serial id (optional).

The following functions lock the player if the special driver is not available. The kiosk application locks the player after download and unlocks it again before the next download. Bool LockDevice (string PassKey)—disable the device from receiving any files until unlock function is called (Bool UnLockDevice (string PassKey)—enable device for receiving any files. Bool RemoveLock (String passkey)—remove the locking (i.e. allow receive files from any source).

The .NET object or wrapper serves as a translator between the kiosk application and the player software.

Figure 7:
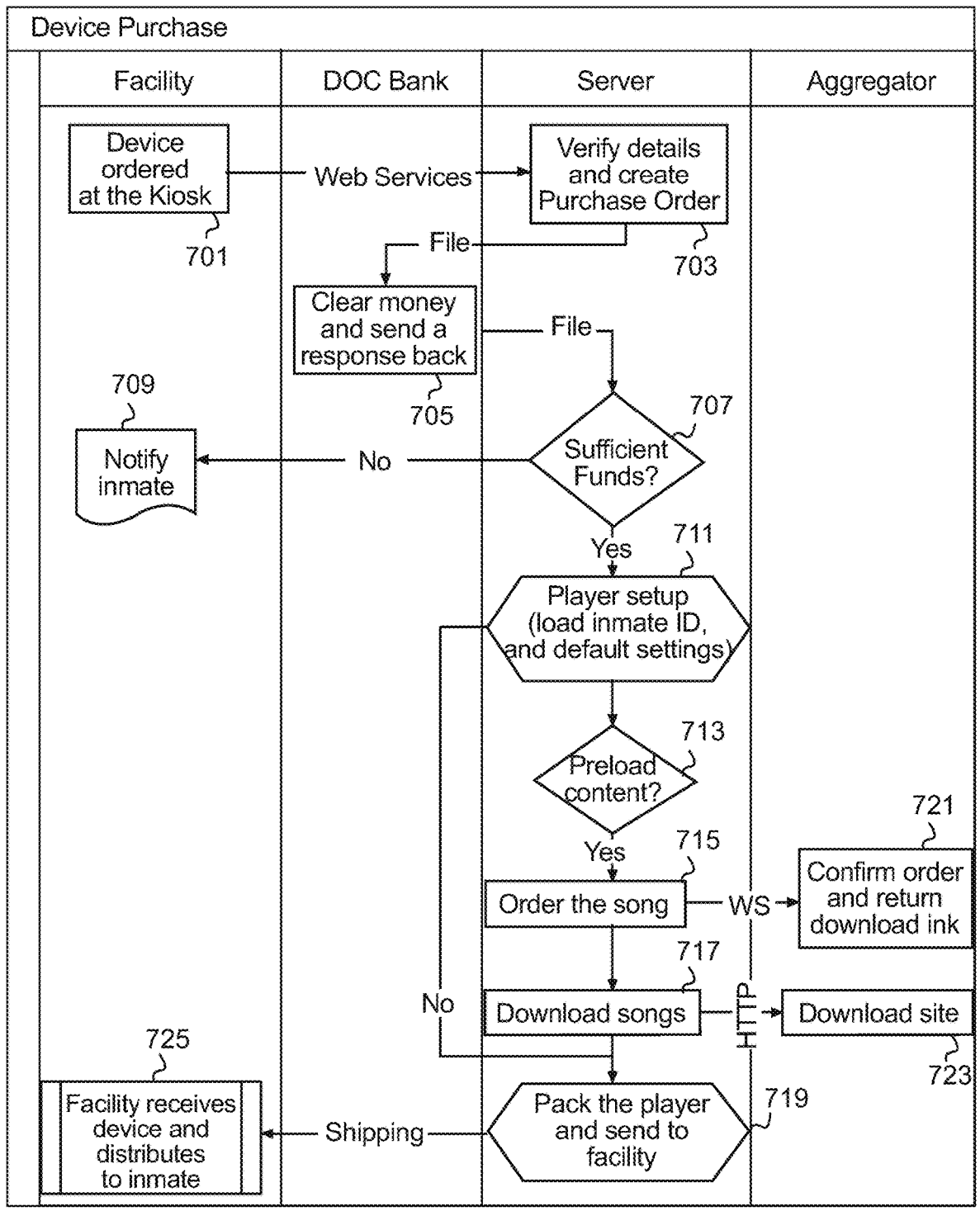
FIG. 7 illustrates the processing of a purchase order for a content player using a kiosk application in accordance with one embodiment of the present invention.

FIG. 7 illustrates a method for processing a purchase transaction for a player using the kiosk application. At step 701 the inmate places an order using the kiosk terminal. The order is communicated to the global server via web services. At step 703 the global server verifies details of the order and creates a purchase order. The global server verifies that the order amount can be cleared by the Department of Corrections ("DOC") Bank. At step 705 the DOC Bank sends a response to the global server to notify whether there are sufficient funds in the account associated with the inmate making the request. An inmate account can be replenished through deposits made on behalf of the inmate by family or friends, or in the alternative, through work programs established by the corrections facility, for example. At step 707, if the global server determines that there are not sufficient funds, then the inmate is notified through the kiosk terminal, for example.

If the global server determines that there are sufficient funds, then global server creates a player setup file. This file includes the inmate ID and other default settings. The file is then uploaded into the ordered player. If the inmate does not select an option to preload the player with content, then the player is packed and shipped to the inmate's facility (step 719).

If the inmate selects an option to preload content into the player (step 713), then global server requests the pre-required content (e.g., songs), from the media server. This request may be made over web services. At step 721 the media server confirms the order for purchase of a song, for example, and in response to the request returns a link for downloading the content. After receiving the link, the global server downloads the songs (step 717) over an http connection from a download site (e.g., the media server). After the player is preloaded with content, the player is packed and shipped to the inmate's facility (step 719). At step 725 the player is distributed to inmates.

Figure 8:
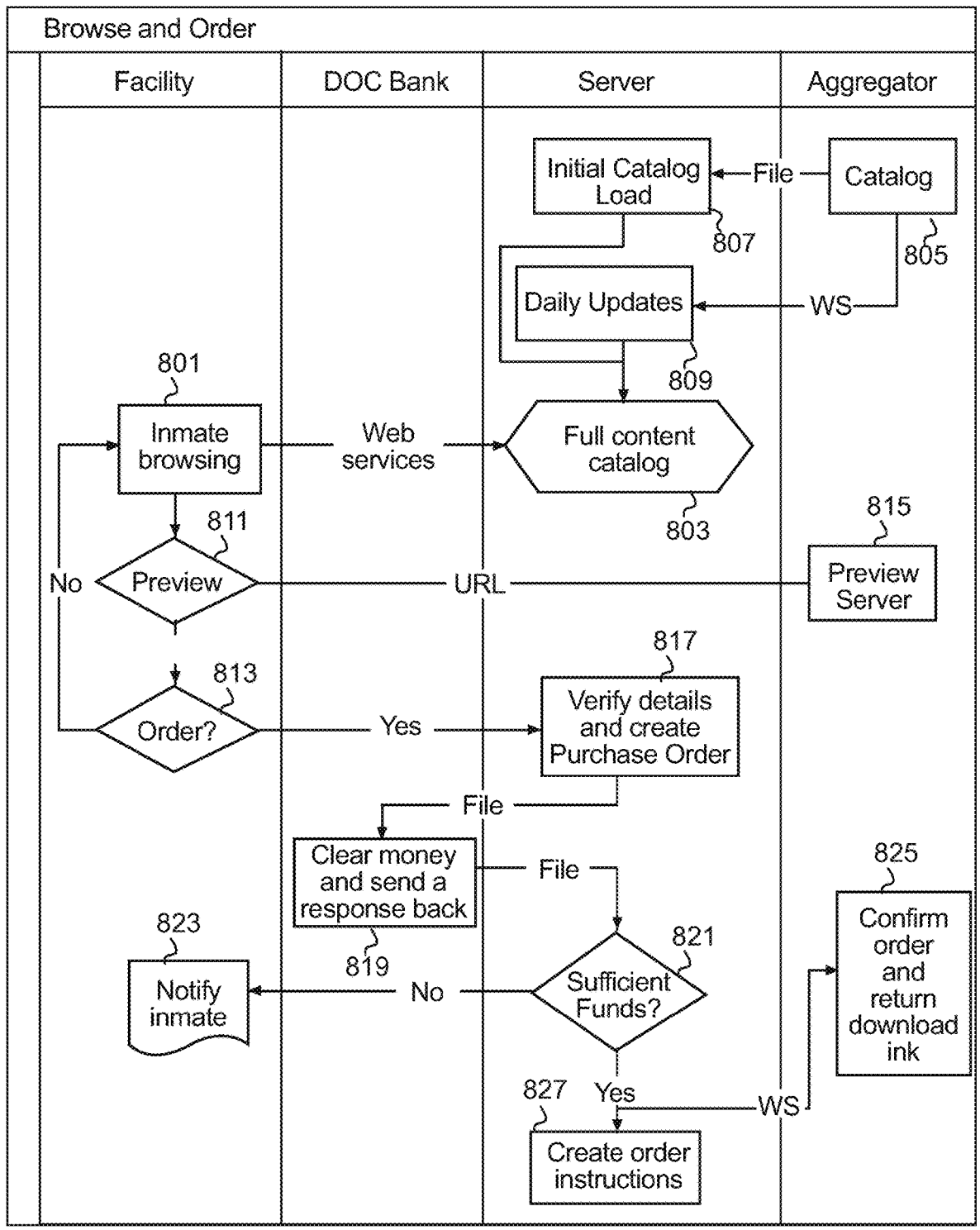
FIG. 8 illustrates a process for ordering and browsing content through a kiosk application in accordance with one embodiment of the present invention.

FIG. 8 illustrates a process for ordering and browsing content through the kiosk terminal. At step 801 the inmate initiates browsing through the kiosk terminal. The local server may communicate with the global server over web services to access the catalog (step 803). The catalog residing in the global server is first uploaded 807 from the media server 805 over an Internet connection. Daily catalog updates may be transmitted to the global server over web services 809.

In step 811 the kiosk presents an option to preview the catalog. The preview may be accessed directly by clicking on a URL link to the media server, for example (step 815). Either after previewing content or skipping the preview option, the inmate may use the kiosk terminal to order content (step 813). The kiosk sends a request for selected content to the global server and the global server verifies details of the order and creates a purchase order (step 817). The global server verifies that the order amount can be cleared by the DOC Bank. At step 819 the DOC Bank sends a response to the global server to notify whether there are sufficient funds in the account associated with the inmate making the request. At step 821, if the global server determines that there are not sufficient funds, then the inmate is notified through the kiosk terminal (step 823), for example.

If the global server determines that there are sufficient funds, then global server sends a request to the media server to confirm the order and the media server returns confirmation and a link for downloading the content (step 825). The global server also creates order instructions to the local download manager including inmate ID, location, download URL, and download time, for example.

Figure 9:
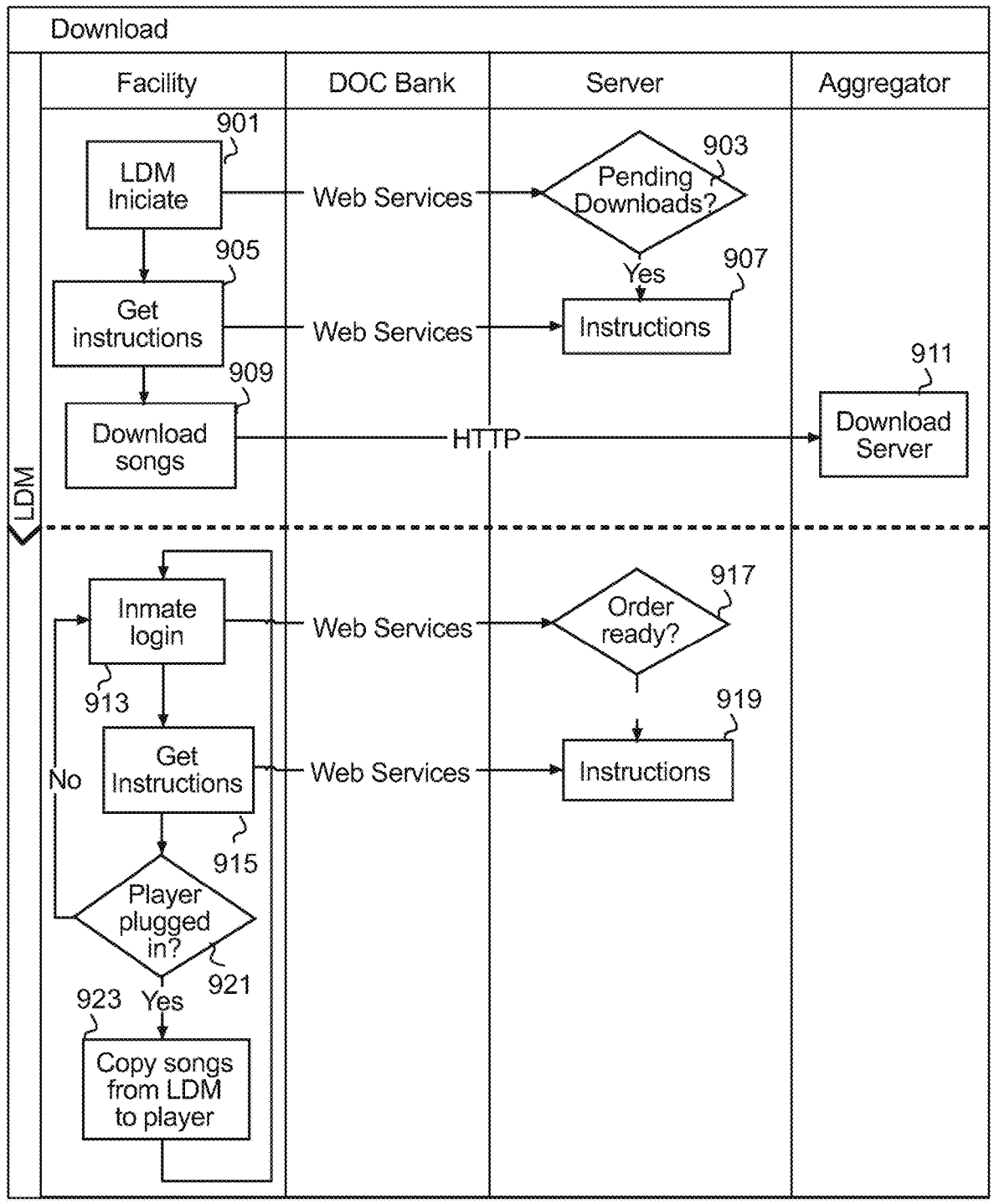
FIG. 9 illustrates content download processes in accordance with one embodiment of the present invention.

FIG. 9 illustrates content download processes in accordance with one embodiment of the present disclosure. At step 901 the LDM running in the local server initiates the content download process by first checking whether there are any pending downloads. The LDM initiates and sends a startup message to the global server over web services and in response to the request the global server verifies whether the local download manager has new pending downloads (step 903). If there are pending downloads, at step 907 the global server creates instructions for downloading content that include instructions to finish pending downloads. For example, if there are pending downloads, the global server creates instructions so that at the next communication cycle the local download manager will retrieve the instructions and download the content. Otherwise at step 907 creates download instructions that do not include pending downloads. At step 905 the LDM obtains download instructions from the global server, again communicating with the global server over web services. At step 909 the LDM initiates download of content, for example music, from the media server by establishing an http connection with the media server. At step 911 the content is downloaded from the media server.

At step 913 the kiosk terminal displays a login screen to an inmate. After log in, the kiosk checks whether an order for content is ready. The kiosk sends a request to the global server over web services and in response to the request the global server verifies whether the inmate order for content is ready (step 917). If the order is ready, at step 919 the global server creates instructions for authorizing delivery of content to the player. At step 915 the kiosk obtains the order instructions from the global server, again communicating with the global server over web services. For example, the global server may direct the kiosk to access the local download manager to copy content awaiting to be downloaded by inmates.

At step 921 the kiosk determines whether the content player is plugged in to the kiosk, and if it is not the inmate may be taken back to the login screen. If the player is connected, then content is copied from the LDM to the kiosk and then to the player at step 923. After the download is complete, the kiosk displays a login screen again.

Other aspects of browsing and ordering content will be described below with reference to FIGS. 10-16. Generally, the local server provides the kiosk with specific offerings per inmate based on restrictions set by the facility. Inmates log into the kiosk and then browse through the catalog of specific offerings.

The searchable catalog may be organized based on artists, albums or genres. Content length, cost and position in the album may be displayed at the song level.

Song previews may be played and listened to at the kiosk (via LDM connection to the Internet and onto the media server site), and album covers may be displayed, as well as artist images when available. Previews may be available per song by routing the requests for previews in real time to the media server. The preview may be secured behind a Flash button to prevent a localized download of the preview clip. After accessing previews inmates may order a number of songs, based on their account balance, or purchase a full album. Once the order is complete a confirmation appears notifying the inmate about cost of order and order processing time. Inmates may check on their order status at any given time during the download process. The global server keeps a status record of every order for audit purposes. For example, each component in the system may send a status update of the content (e.g., pending, purchased, downloaded, copied, etc.) to the global server.

Figure 10:
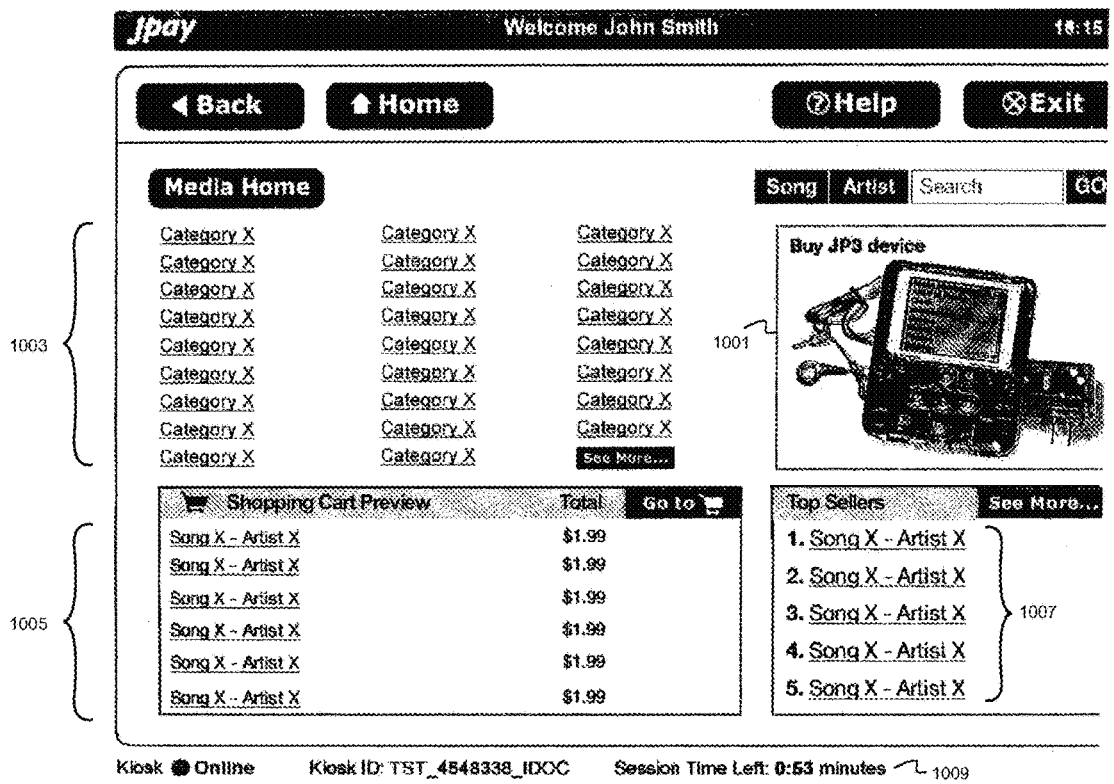
FIGS. 10-16 illustrate screenshots displayed by a kiosk terminal to allow a user to browse and purchase content and a content player in accordance with one embodiment of the present invention.

FIG. 10 illustrates an exemplary screenshot that may be displayed by the kiosk terminal. The kiosk may display an image of a content Player which inmates can order through the kiosk (1001). The kiosk may display categories of music (1003). These categories may include rock, rap, R&B, etc. The kiosk may also display the content items that an inmate has already selected for purchase (1005). The kiosk may also display the top selling songs 1007.

Figure 11:
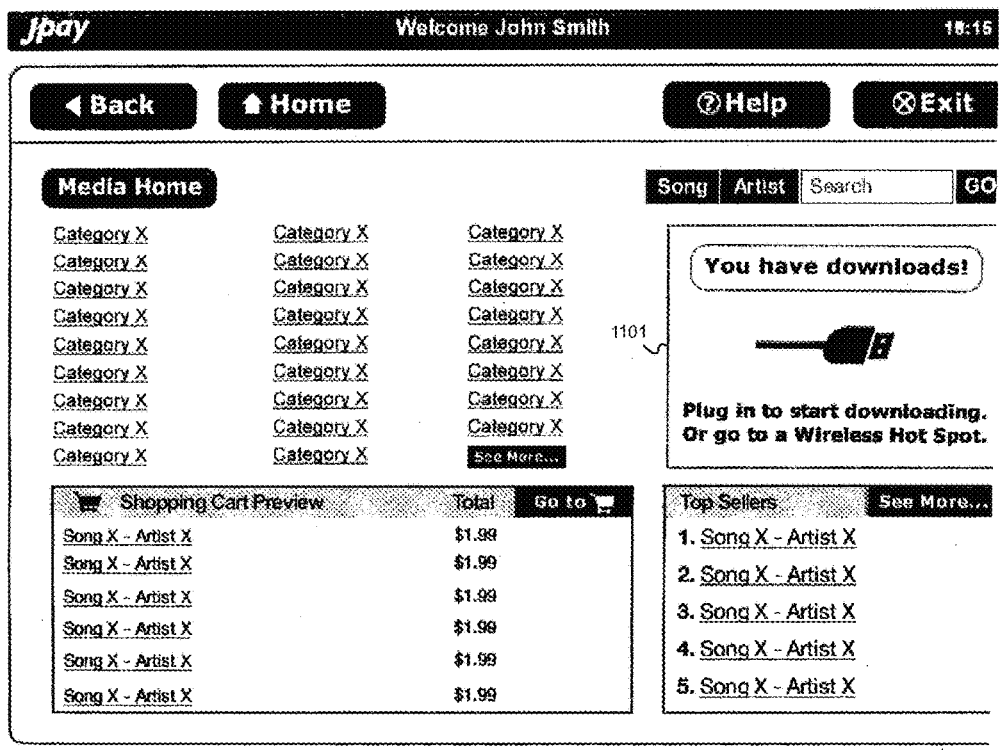
Figure 12:
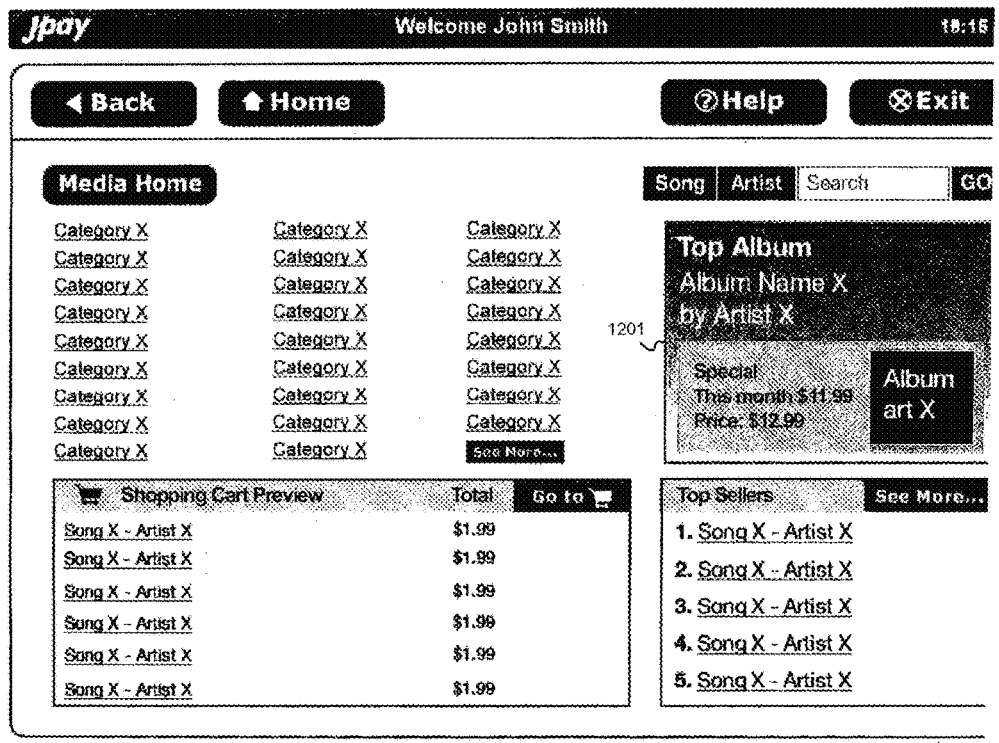

FIG. 11 illustrates a screenshot similar to that in FIG. 10 except that the kiosk displays a message that content is ready to be downloaded. The content may be downloaded by the inmate physically connecting the Player to the kiosk, or in an alternative embodiment, by wirelessly connecting the player to the kiosk my moving the player to a wireless hotspot. FIG. 12 illustrates advertisements that may be displayed by the kiosk. In the illustrated exemplary display, the inmate is presented with an offer to buy a top selling album (1201).

Figure 13:
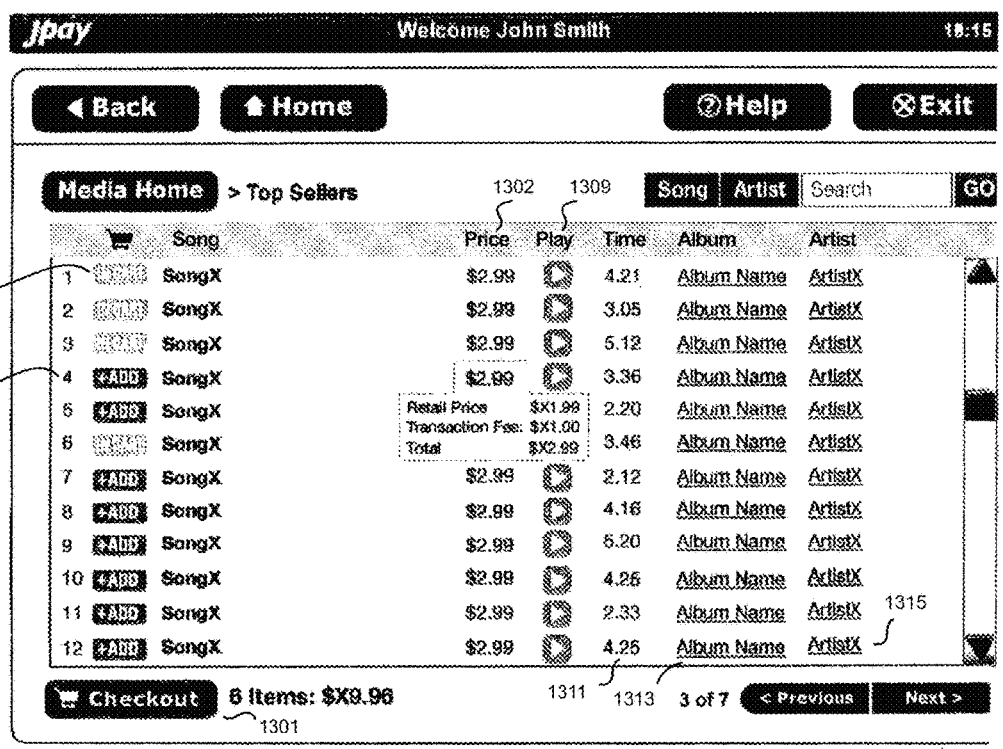

FIG. 13 illustrates a screenshot of the kiosk displaying top selling songs. The kiosk may display whether the songs have already been added to a shopping cart (1303) or not (1305). Other information related to each song may also be displayed, for example, the price 1302, the length of the song 1311, the album 1313, and the artist 1315. An option to play a clip of the song may also be displayed 1309 as well as an option to checkout 1361.

Figure 14:
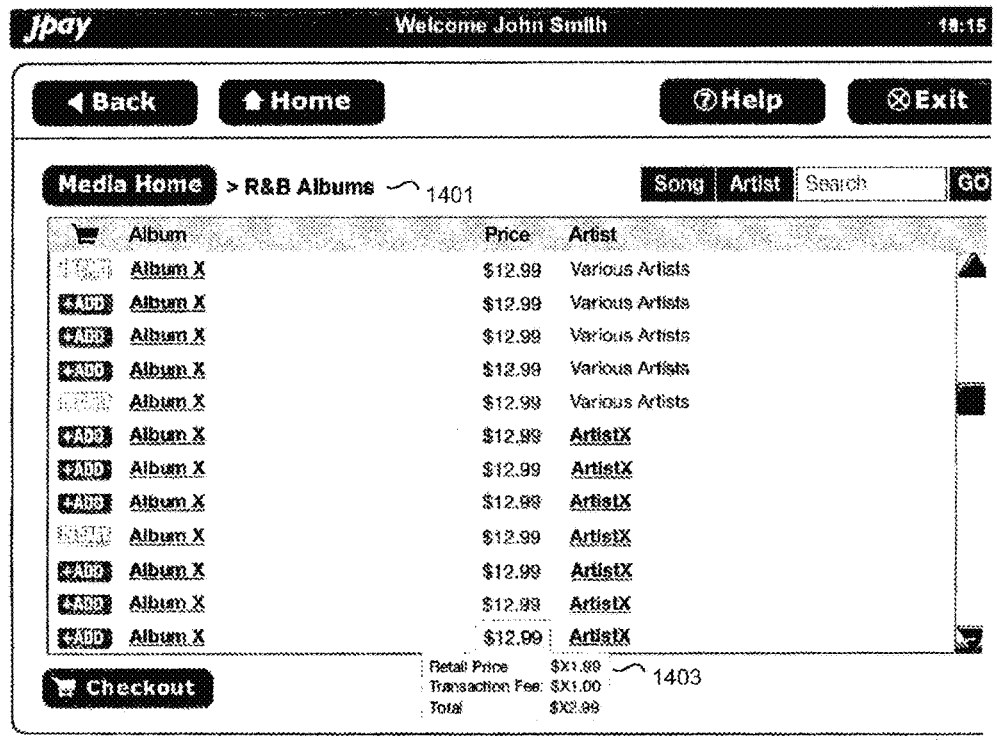
Figure 15:
Figure 16:
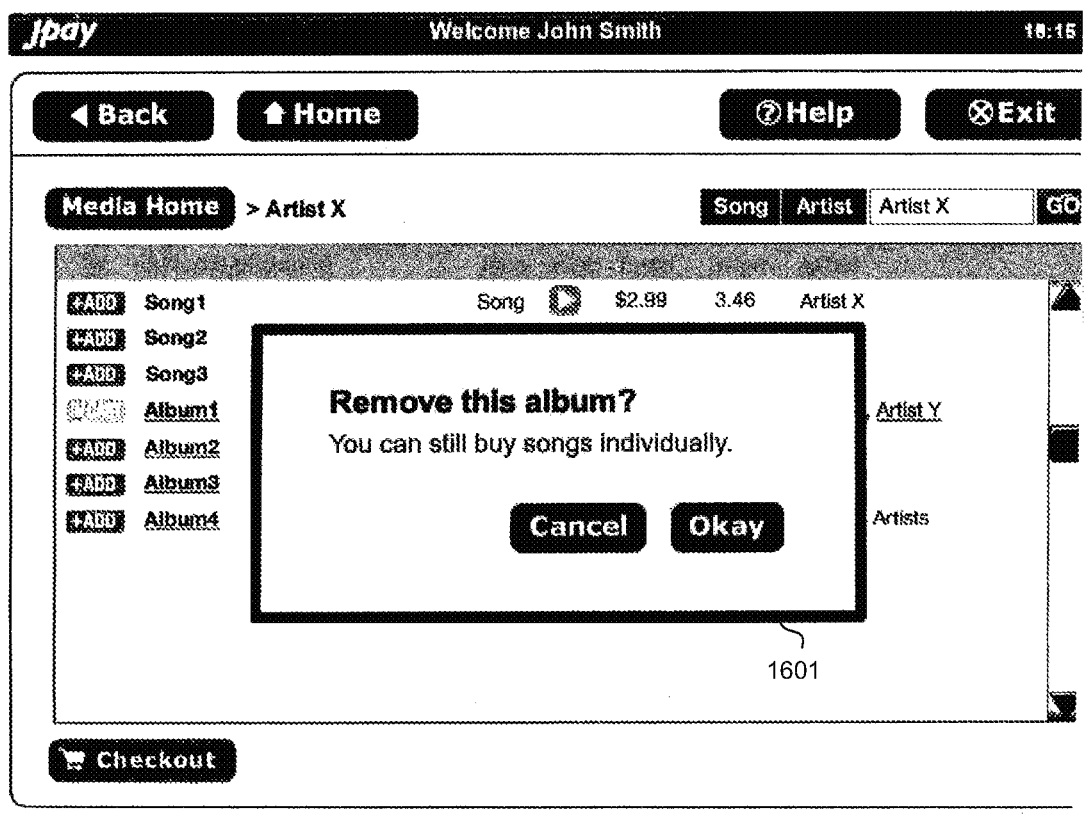

FIG. 14 illustrates a screenshot of songs displayed by the kiosk under the R&B category 1401. The kiosk also displays the price per song, transaction fee, and the total price 1403. FIG. 15 illustrates a screenshot of songs displayed by the kiosk under the Artist category 1501. FIG. 16 illustrates a screenshot of the kiosk displaying an option to remove content previously added to the shopping cart 1601.

Figure 17:
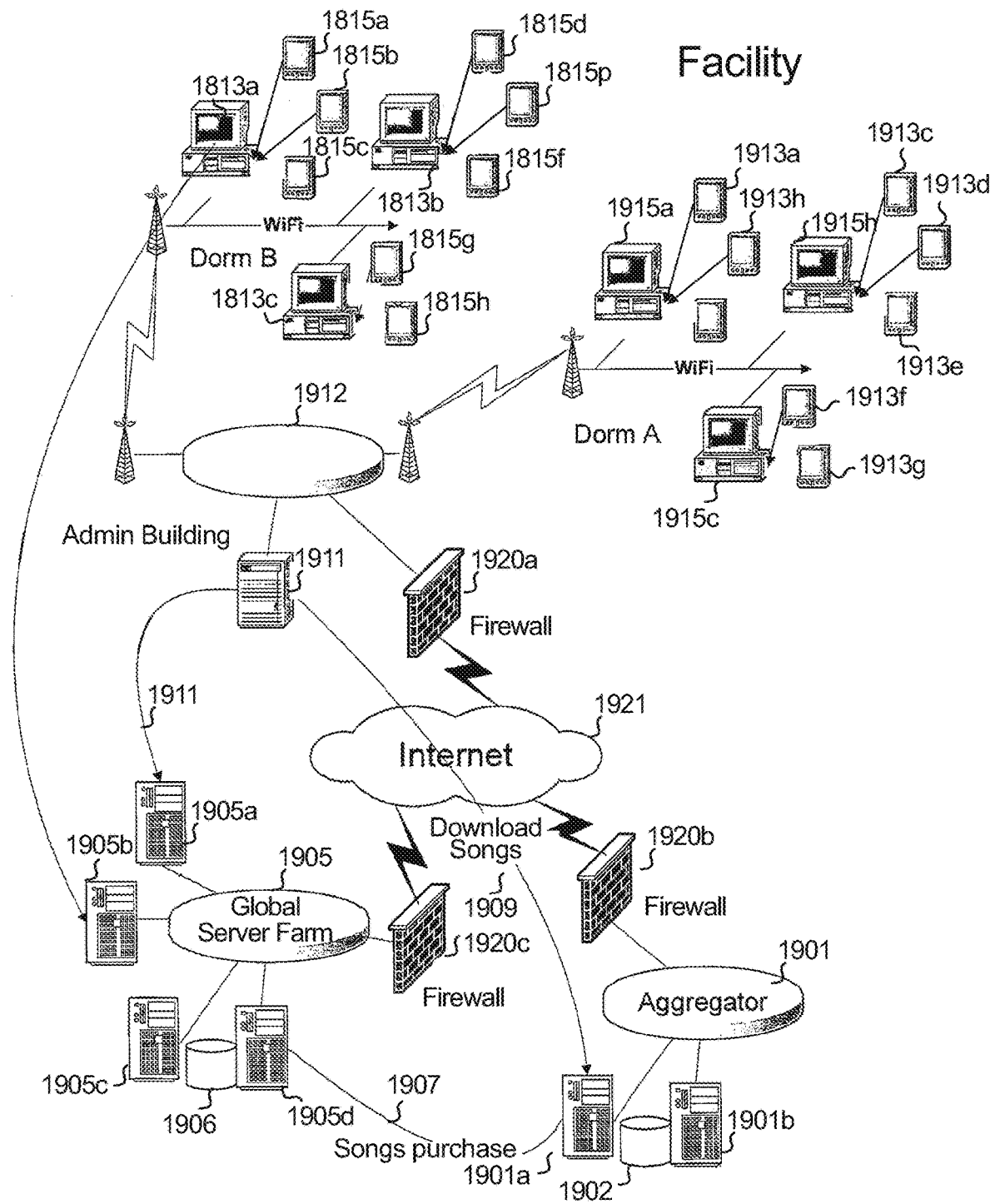
FIG. 17 illustrates a system for delivery of digital content in accordance with another embodiment of the present invention.

The system of the present disclosure in accordance with another embodiment (FIG. 17) may include the following components:

Global Server Farm 1905: The Global Server Farm 1905, including servers 1905*a-d* and a database 1906, administers services to an online store running in Aggregator 1901 and eCommerce over the Internet 1921. The Aggregator 1901 may include servers 1901*a-b* and a database 1902.

Inmate Kiosks 1813*a-c* and 1913*a-c*: Allow inmates to securely interact with local server 1912 and LDM 1911 over a secure facility network. In one embodiment, the kiosk terminals do not allow localized storage or access to regular Windows-level folders. Each kiosk terminal may run a kiosk application to prevent the inmates from treating the terminal as a regular PC with OS access. The kiosk application ensures that the kiosk is solely used as a window into the local server 1912 and local download manager 1911 and only connects to the web for specific pre-approved functions within the media store (run by global server farm 1905), such as listening to song previews from the content provider's Aggregator 1901. To prevent OS access, software such as siteKiosk from Provisio may be used.

Local download manager ("LDM"): This application may run on the Local Server 1912 or may run on a separate machine 1911. The LDM administers the synchronization of media delivery between the Global Server Farm 1905, Inmate Kiosk (e.g., 1913*a*), and a Player (e.g., 1915*a*). Content resides on the Local Server 1912 and the LDM 1911, which is then delivered to Players through the corresponding kiosks.

Digital Content Player (or Player): The portable digital content player may be purchased by an inmate. An inmate synchs the Player and downloads files securely through a kiosk after purchase of content using a personal account created and maintained at the Global Server Farm 1905. The Player may be implemented as a custom-made device for the corrections industry that allows delivery only of approved content via specific USB codes which prevent unauthorized connections. All inmate interaction with the Global Server Farm 1905 and the Aggregator 1901 is conducted using a unique inmate ID to ensure security and prevent cross-pollination or abuse of account information or purchased media.

In one embodiment of the disclosure the digital content includes music and may be maintained in a catalog by the content aggregator 1901. In an alternative embodiment the system administrator for Global Server Farm 1905 may also administer the Aggregator 1901. In another embodiment of the disclosure, the player displays inmate correspondence, including pictures and videograms.

In one embodiment, the aggregator 1901 obtains the content from the different music labels to update the catalog and uniformly funnels the content catalog over the Internet to the Global Server Farm 1905 as XML files. The Global Server Farm 1905 loads the catalog from the Aggregator 1901 and processes it to fit any general or specific restrictions. The catalog may include links to previews and album art which reside on the Aggregator's site at all times and are provided through a direct link from the kiosk.

The Global Server Farm 1905 may get daily updates to the catalog from the Aggregator 1901 using the SOAP API. To purchase a song from the Aggregator 1901, the Global Server Farm 1905 also may use SOAP API. After a purchase is made, the Global Server Farm 1905 sends download instructions to the local server 1912 to download the songs. The inmate then connects to the kiosk which in turn copies the files from the local server 1912 to the digital content player.

The Local Download Manager (LDM) may be implemented as a standalone computer 1911 used to manage the content downloads between the Local Server 1912 and Players (using the kiosks as enabling pass-through units). In one embodiment, the LDM 1911 centralizes management of all tasks, for example content downloads, local storage, etc., in one location per inmate facility, and the Local Server 1912 runs separately and is not physically accessible to inmates. The LDM 1911 may include predefined settings which provide general information about the Aggregator's site 1901 (URL, user name, password etc.). The LDM 1911 transfers information about processed orders into a file system in the local server 1912 before a content download begins. The order for content contains inmate ID, song name, and access instructions. Each completed delivery of content to the Player is reported back to the Global Server Farm 1905 and the Local Server 1912 and stored on a file system locally at Local Server 1912. The kiosk deletes the content file copy from the local server 1912 after it is transferred from the local server network drive directly to the Player (i.e., after successfully copying the files to the digital content player).

In one embodiment of the present disclosure, the LDM 1911 communicates with the Global Server Farm 1905 over Web Services and LDM 1911 acts as the client (e.g., LDM

1911 will pull information from Global Server Farm 1905). The LDM 1911 may be accessed through a management console with HTTP based user interface ("UI") and may also have a local text based log file to describe main actions.

The LDM 1911 may obtain specific downloaded instructions from the Global Server Farm 1905. Local Server 1912 downloads the content from the Aggregator 1901, stores the content on its local file system, and provides the kiosk access to the stored content to retrieve songs, for example, and deliver them onto the Player. Each inmate may have a directory on the local file system with subdirectories for downloads and galleries and can only access his or her own account.

In one embodiment of the present disclosure, a kiosk terminal (e.g., 1813*a-c* or 1915*a-c*) has pre-defined settings to access the local server 1912 file system root directory using a share drive mechanism. The local server 1912 notifies the kiosk when content is ready to be downloaded to the player, after which the inmate will be allowed to start downloading media directly to a registered Player. The Player may connect to the kiosk through a standard USB port.

After connecting the player to the kiosk, the kiosk identifies the player, for example, based on the inmate id or other identification parameters embedded in the player during the fulfillment process. Unrecognized players/devices are not immediately served. When the kiosk matches the inmate id to the Player and session id, the player is allowed to download content. At the start of the download, the kiosk accesses the inmate directory on the local server file system and copies all new files in this directory directly to the Player (one-way synch process). Download includes copy or, if configured, moves the content files from the inmate folder on the LDM directory to the player. In one embodiment, files will not be saved on the kiosk file system. Advantageously, the player should not be disconnected from the kiosk while downloading content. The kiosk may display a message to the inmate such as "Downloading, do not disconnect." The Kiosk application disables an auto logout feature during download and resumes when the download is complete.

After download of content is complete, the following can take place: (1) a summary message is displayed to the inmate (songs, price, etc); (2) a status change notification of a completed download is sent to the local server; and (3) the kiosk application collects the player's statistics (number of songs and available space) and sends it back to the local server.

When the kiosk is in the process of authenticating an inmate, if the kiosk does not match the inmate id to the Player and session id, the kiosk will stop serving the player and perform the following actions: (1) the kiosk sends a notification back to the local server 1912 to be propagated to the appropriate facility user—this prevents the inmate from continuing to use the unauthorized device by either moving all songs from the player to the inmate directory on the LDM or disabling the Player; and (2) the kiosk displays a message to the user and marks his account as "Locked."

In addition to facilitating the downloading of content into the player, the kiosk application is responsible for the Player maintenance and control in accordance with one embodiment of the disclosure. Each Player is registered to one inmate and includes a unique ID to be matched with a specific inmate ID. Each kiosk can only access the inmate's account on the Local Server 1912.

Player access to the kiosks may be restricted by "burning" an individual inmate ID into the player device's memory. In one embodiment, the kiosk allows downloads for inmates that authenticate themselves at the kiosk and then connect a Player with a matching ID. If the Player is not verified the kiosk sends a "lock" command to the Player to prevent further use.

In an embodiment of the disclosure, there are two specific methods of communication with the Player. In a first method of communication, a specific driver allows interaction between the kiosk and the player only if the driver is loaded to the kiosk terminal (this eliminates unauthorized PC connections). The "mass-storage" capabilities may be excluded from the driver to eliminate the risk of using the player as a flash drive.

In a second method of communication between the kiosk and the player, a .COM object or .NET assembly is loaded in real-time by the kiosk application or software library and is compiled to the kiosk application with the following functions:

Int GetInmateID (string PassKey)—return inmate id or −1 if wrong passkey or inmate id is not available.

Passkey may be defined as a predefined string used for security purposes. Int PutInmateID (string PassKey, string id)—store a new id on the device. Bool ChangePassKey (string currenPassKey, string newPassKey)—change the passkey.

Int GetDevice serialID (string PassKey)—get a unique serial id (optional).

The following functions lock the player if the special driver is not available. The kiosk application locks the player after download and unlocks it again before the next download:

Bool LockDevice (string PassKey)—disable the device from receiving any files until unlock function is called; and (Bool UnLockDevice (string PassKey)—enable device for receiving any files. Bool RemoveLock (String passkey)—remove the locking (i.e. allow receive files from any source).

Figure 18:
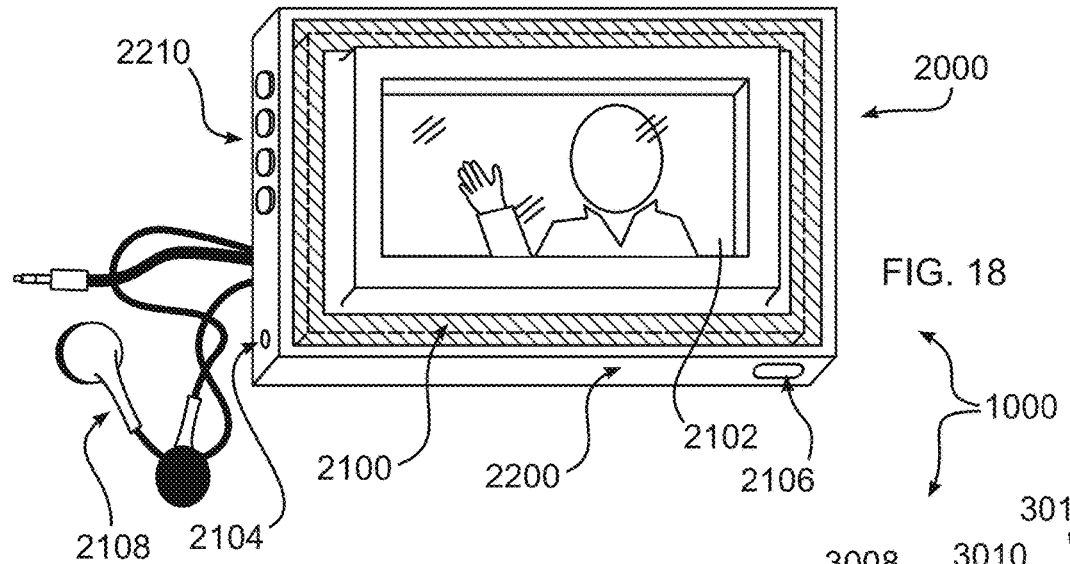
FIG. 18 illustrates a portable player in accordance with the disclosure, operative to securely present digital content.
Figure 19:
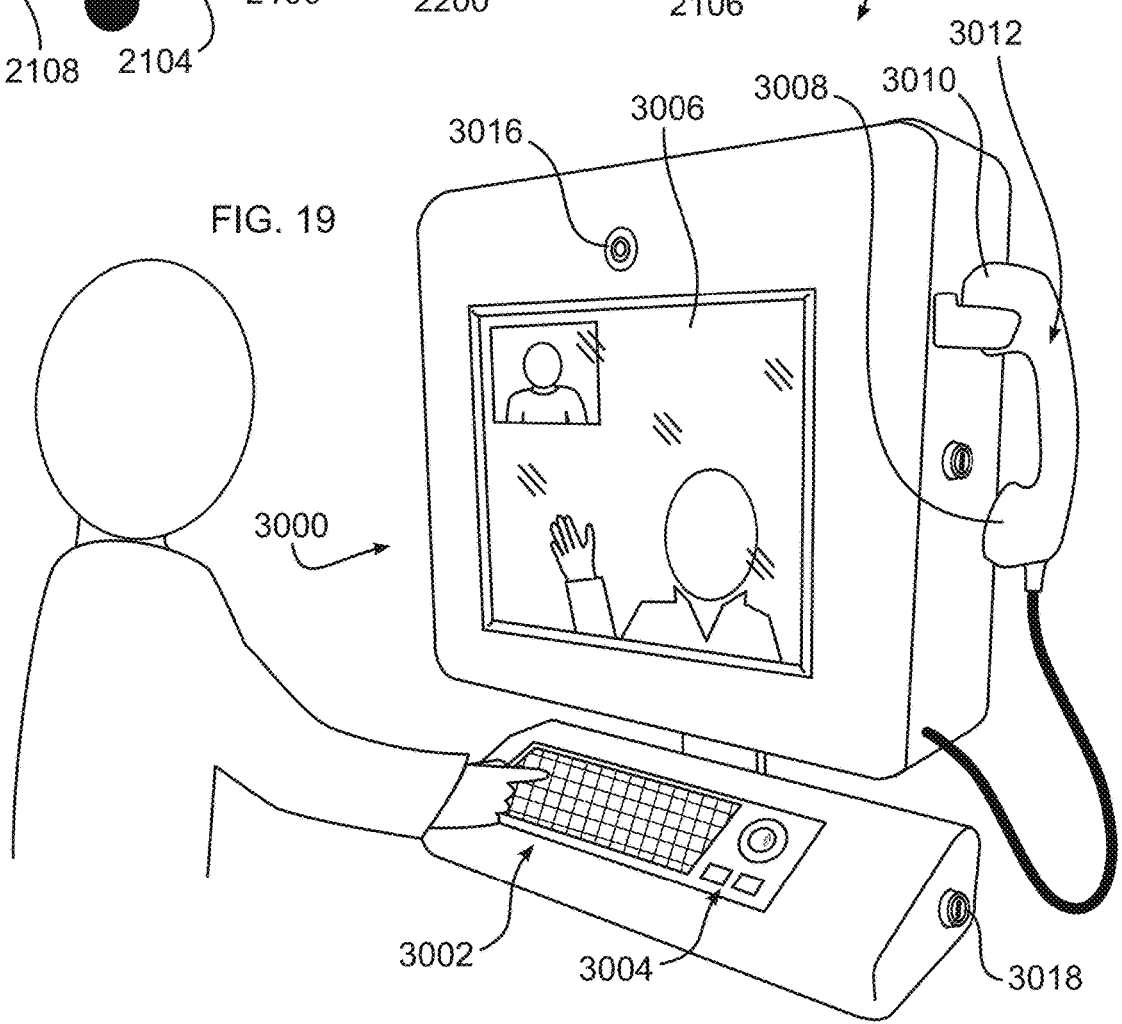
FIG. 19 illustrates a user kiosk in accordance with the disclosure, operative to securely present and create digital content.

With reference to FIGS. 18-19, additional embodiments of a system 1000 for enabling purchasing, recording, displaying, and managing visual and video media in digital format, include a portable player system 2000, and a general access kiosk system 3000. The following described elements of system 1000 can implement all of the features described hereinabove for corresponding elements of the invention, including the features as described below.

With reference to FIG. 18, portable player 2000 is sized and shaped to be easily carried by a person, for example an inmate. In one embodiment, player 2000 is sized to fit in an ordinary pants or shirt pocket, for example less than 7×5×1 inches in dimension and 1 pound in weight. In another embodiment, player 2000 is sized larger than a typical pocket, but still sufficiently small to be easily carried about using one hand of a person, for example having a dimension of less than 10×15×2 inches, and less than 5 pounds in weight. In either size embodiment, a typical dimension and weight may be substantially smaller than the exemplary dimension and weight given, for example half of this dimension and weight or less. Player 2000 can be provided to inmates, and if permitted, used within an inmate's cell.

Player 2000 includes an electronic computing player device 2100 having a video display 2102, for example a TFT LCD, IPS LCD, OLED, or AMOLED type display. Display 2102 can be touch sensitive, for example including capacitive or optically sensitive elements (not shown), configured to pass information to a processor 2014 within device 2100, indicative of a location of an pointing object moved upon or near display 2102.

In the embodiment shown in FIG. 18, player device 2100 is wholly or partially contained within a housing 2200, operative to protect player device 2100. For example, housing 2200 may prevent access to the constituents of player device 2100, to prevent misuse of these components by inmates. Additionally, or alternatively, housing 2200 provides cushioning for shock, for example from dropping player 2000, and can protect player device 2100 from exposure to moisture, heat, or other environmental hazard. In one embodiment, only display 2102 is exposed exterior of housing 2200, although housing 2200 may additionally include a transparent layer covering display 2102.

One or more control switches or buttons 2210 located on an exterior surface of housing 2200 can be provided, communicative with corresponding switches, buttons, or other control feature or function of player device 2100, for example using a mechanical actuator, or electrical signal. Similarly, one or more electrical ports or outlets may be provided in an external surface of housing 2200, electrically communicative with a corresponding port within player device 2100, for example an audio port 2204 connectible to a sound transducer 2108, or a data exchange/charging port 2106, connectable to another computing device.

Player 2000 can be powered by a rechargeable battery, for example a lithium based battery, which may be recharged for example by connecting player 2000 to a power source. Alternatively, player 2000 may be powered by replaceable batteries, or solely by a power cord connectable to a power source, for example a wall outlet or power converter. There are security considerations attendant with each option, which can be considered by correctional facility staff. Player 2000 can provide storage of digital information by any known or hereinafter developed method, including flash memory or magnetic media. In one embodiment, player 2000 includes 8 GB of storage, although 16 GB or 32 GB may be provided as options, for example, or in the future, much higher storage quantities may become available, with considerations given to cost, size, and power requirements. Because player 2000 is permanently sealed, in one higher security embodiment, memory or batteries may not be replaced after player 2000 is configured and finally assembled. Herein, correctional facility staff includes all agents authorized to conduct acts on behalf of, or for the benefit of, the correctional facility.

With reference to FIG. 19, a computer system to which player 2000 may be connected includes stationary computer system, or kiosk 3000. The connection between player 2000 and kiosk 3000 may be established using data port 2106 and a cable connected to a corresponding port (not shown) within kiosk 3000, or by any other known or hereinafter developed means, including Bluetooth (a registered trademark of Bluetooth SIG, Inc., a Delaware corporation) or other form of wireless connection. One or more human interface devices can be provided, for example a keyboard 3002, which may be substituted with a touchscreen keyboard, for example, and a pointing device 3004, for example a trackball, also replaceable with a pointer moveable upon a touchscreen. Kiosk 3000 further includes an internal processor 3014 (not shown). A video display 3006 is provided, as well as a microphone 3008, one or more speakers 3010, which can be provided as a handset 3012, or as separate components connected to kiosk 3000, and a video camera recorder 3016. One or more locks or security devices 3018 can be provided, operative to secure from access, turn off, configure, or disable one or more functions or components of kiosk 3000. Kiosk 3000 can be fabricated from rugged materials which cannot be broken or opened without tools.

One or many kiosks 3000 may be provided at each correctional facility, for example in each dormitory. Each kiosk executes software, which can be stored upon nonvolatile memory or other digital storage medium, the software operative to carry out the instructions and functions described herein. Some instructions may be executed remotely, using another computer and a network, for example a LAN or WAN, including the internet. Players 2000 and Kiosks 3000 may be configured to support video visitation, described further herein, as well as email, online banking, and a digital store, provided all forms of digital content, including music, books, and videos. In addition, inmates and other users may order from a commissary associated with the correctional facility. Further, educational materials, including prerecorded and live instructions can be provided. Not all applications which can be provided by player 2000 and or kiosk 3000 would be deemed suitable for all inmates at all times, but such functionality can be provided for workers or visitors to correctional facilities, and can include games, gaming, and other forms of entertainment. All applications may be provided on both player 2000 and kiosk 3000, or the range of applications on each may be different. Individual application may differ between each of player 2000 and kiosk 3000.

In one embodiment, all computing applications and functions available to inmates may be carried out by one or both of player 2000 and kiosk 3000, and people associated with an inmate can participate with the inmate for all such applications and functions using a single website which hosts corresponding functionality.

In one embodiment, a player provides login information to access functionality of player 2000 or kiosk 3000, for example a username and password. As kiosk 3000 may be a general use device, both a username and password may be required. Both a username and password may be required when using player 2000, as well, or alternatively, if player 2000 is uniquely associated with a single user, for example using an internal chip identification, player 2000 can be configured to require a password only.

Figure 20:
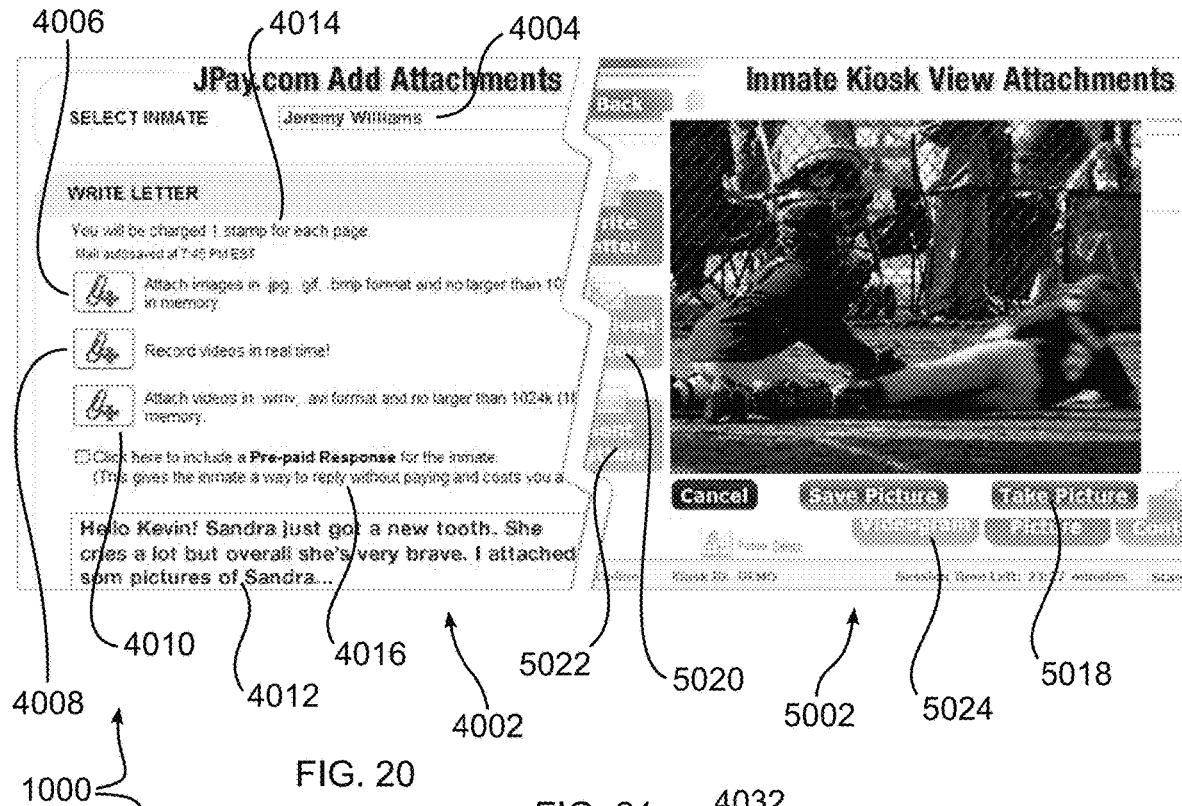
FIG. 20 illustrates an email application of the disclosure, executable upon an embodiment of a player or kiosk of the disclosure.

With reference to FIG. 20, an email application 4002, executable upon one or both of player 2000 and kiosk 3000, enables an inmate to read email messages from approved senders, the incoming email subject to preapproval by correctional facility staff. An inmate may also compose, and send emails to approved recipients, such emails also subject to review and approval by correctional facility staff. Incoming and outgoing email may be flagged or identified for review by containing keywords generated by correctional facility staff, and may also be flagged, blocked, or screened for whether content may be exchanged between particular senders and receivers. The keyword list may be generated using keywords found in other inmates' emails, where certain words were found to be associated with non-approved activity. In accordance with the disclosure, the collection, monitoring, and distribution of digital content is carried out within a closed system. More particularly, the digital content, including email and video data, is under the control of software of the disclosure, so that it may not be altered, and so that its origin and contents may be known, and that the digital content cannot be altered once collected by the system.

At left in FIG. 20, a portion of a web application image, or web image 4002, of a web correspondence application, or web app 4000, designed to be used by a person not an inmate (an outside user), is illustrated. To the right of FIG. 20, separated from web app 4002 by a divider, is shown a portion of a local executable application image, or local image 5002, of a local correspondence local executable application, or local app 5000, useable by the inmate. In one embodiment, web app 4000 can be implemented by a web browser (e.g. CHROME, SAFARI, or FIREFOX), supported by a web server application.

Local app 5000 can be an executable program running natively on player 2000 or kiosk 3000, for example an application written in C++, although an application running in an execution environment, such as JAVA or .NET, may also provide a suitable alternative. Local app 5000 is additionally supported by a local server 9000 (including, as noted, local server 611), for example a server situated upon a LAN connected to player 2000 or kiosk 3000 by a wired or wireless connection. Accordingly, the term "local" is used only for convenience, and aspects of local app 5000 may be run by a remote processor, and the local server may be very remotely located with respect to a machine executing local app 5000.

The web server or local server provides functionality which can include generating images or visible content; performing calculations; storing, retrieving, forwarding, and manipulating data; implementing security and limiting access rights; communicating with other servers, for example a payment server; and other functions, as described herein and as understood within the field. It should be understood that some or all functions of a web server or local server may be carried out by one or more of a kiosk 3000.

An advantage to providing a web style application for outside users is that there may be many outside users, and not all of them may wish to install an executable style application on their computer. Further, by providing a web application, outside users can communicate with inmates wherever they may be located, without a requirement of having access to a computer upon which a corresponding executable is stored. An executable is advantageous for inmates using player 2000 or kiosk 3000, because it is imperative that only a predefined set of activities are possible, and a self contained executable program provides the greatest level of control and security. Additionally, the set of computers upon which these functions are to be carried out is limited and known in advance, enabling deployment of an executable to be expeditious. Notwithstanding the foregoing, it is still possible for either or both of the inmate systems or outsider systems to use either a browser based application or an executable application.

Although web app 4000 and local app 5000 are shown together, it should be understood that they operate independently, the product of each stored until it can be delivered to the other, unless there is real time communication being carried out between the applications, as described further herein. It may be seen that web image 4002 illustrates services for adding attachments, a subset of the functionality of web app 4000. An inmate name, to whom the communication is to be directed, is shown selected 4004. This name may be typed in, or may be selected using a search and or drop-down list functionality.

An outside user may additionally select an image attachment function 4006 for attaching one or more images in any of a plurality of formats, and record videos, e.g. to produce a videogram, in real time. With respect to the latter, the sender may select a record video function 4008, at which time they will have an opportunity to record a video message for sending to the inmate using a video camera within, or connect to, their computer. Alternatively, an outside user can select an attach video function 4010 to send one or more previously recorded videos in any of a plurality of formats. An outside user may additionally enter the text of the message 4012, as well.

As may further be seen, there can be a charge for each message or attachment, here a value of "1 stamp" for each page. A stamp can be assigned a monetary value in a previous agreement with a system user, separately, or a value can be established when composing the message. In accordance with the disclosure, an outside user can pay for communications for and on behalf of the inmate. Similarly, an inmate can pay, as well, although due to security restrictions, the inmate allocates credits assigned to the inmate within the system 1000 of the disclosure, to make payments. In this manner, it may be controlled what an inmate is buying. Inmates can acquire credits through their services rendered within the correctional facility, for example, or as paid for by an outside user. An outside user may provide credit for the inmate separately from using web app 4000, or may provide credit as shown in the Pre-paid Response section 4016, or other portion of web app 4000 not shown in FIG. 20.

Local app 5000, running on player 2000 or kiosk 3000, can have the same functionality as described herein for web app 4000, and vice versa, with particular functionality shown for web image 4002 or local image 5002 for convenience, and not to suggest the functionality is exclusive to one application or the other, unless stated otherwise. In FIG. 20, Local image 5002 shows a 'Take Picture' function 5018, wherein an inmate may take a picture (snapshot image) of the prerecorded or streaming video being shown to the inmate, and may save this image to an inmate storage area, for example within player 2000. An outside user may save such an image to their local computer or handheld device. Additionally illustrated is a function to view received letters 5020 and to view sent letters 5022, and to create a videogram 5024, which may be a recorded video, or which may initiate a streaming video teleconference between an inmate and an outside user, where each may view each other while speaking in full duplex.

Figure 21:
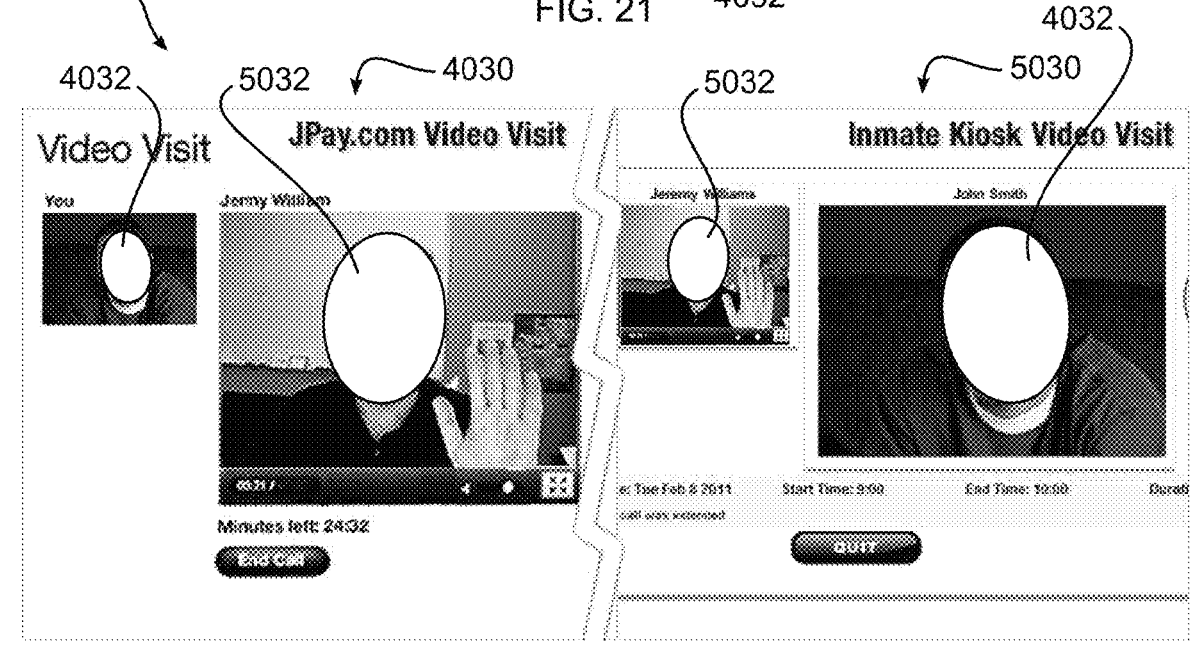
FIG. 21 illustrates a video stream between a web app and a local app of the disclosure.

A video stream between web app 4000 and local app 5000 is illustrated in FIG. 21. It should be understood that in order to accomplish streaming video capture using web app 4000, it may be necessary to have a helper application, or web app 4000 may need to have access to certain underlying functionality of the computer that may not normally be accessible to a browser application. A typical helper application, for example, can be ADOBE FLASH, although other such applications which provide access to other hardware are available, and may become available in the future. In one embodiment, web app 4000 enables a user to enable or disenable the use of hardware needed for video visitation during an ongoing web session.

In FIG. 21, in local image 5030 of local app 5000 is illustrated at right, in which an inmate 5032 is using kiosk 3000. At left, a web image 4030 of web app 4000 is illustrated, in which an outside user 4032 is using a browser and the internet to execute web app 4000 to communicate with local app 5000. In one embodiment, the inmate and outside user can see a relatively smaller image of themselves, and a relatively larger image of the other system user, the images updating at a speed sufficient to approximate real time movement of themselves and the other user. Video and sound are synchronized, as may best be implemented by the particular hardware and connection speed available, when web app 4000 and local app 5000 are executing in mutual communication.

In accordance with the disclosure, images, text, video, and any other inbound data sent to an inmate is reviewable by correctional facility staff before it is available to the inmate. Similarly, images, text, video, and any other outbound digital content, is reviewable by correctional facility staff before it is delivered to the intended recipient. To carry out this review, correctional facility may use software tools of the disclosure which execute upon player 2000, kiosk 3000, local servers, or remote servers, to digitally prescreen content to improve efficiency. For example, keywords generated from reviewing digital content from one or many inmates may be compared with keywords present in the digital content to be reviewed. The generated keywords typically represent prohibited activities or subjects, and digital content containing such keywords may be redacted prior to delivery, or may be blocked from being received or sent.

In one embodiment, software of the disclosure places digital content in a queue or separate location, where it may be reviewed as time is available by correctional facility staff. If later approved, it may be moved to a different queue or location, for subsequent delivery. If later rejected, it may be moved to a different queue or location, for quarantine or deletion.

Digital prescreening for keywords, which herein includes phrases, images, sounds, or any other type of digitally encoded content, can be carried out by software, upon text, encoded text or data such as word processing or pdf files, video files, images, or any other digital format known or hereinafter developed. Software of the disclosure can include software modules or routines which can parse or interpret different types of digital content, for example using artificial intelligence or other methods, to detect text or image patterns or other data which may include the keyword content.

By implementing email, photo sharing, video visitation (streaming two way video sessions), and other digital data exchanges between inmates and visitors, a correctional facility significantly reduces the burden and risk of moving inmates between physical visitation locations and their cells, and minimizes potential physical contact between inmates and visitors. As the system 1000 of the invention provides prescreening, acceptable communications between inmates and outside users do not burden correctional facility staff. Further, system 1000 reduces the burden upon correctional staff to physically open and inspect paper mail, which may include contraband.

Additionally, communications between inmates and outside users which are blocked or non-allowed for an inmate can be managed by system 1000, which can implement a rules based system of enabling or disabling particular types of communication with particular individuals, or communications with approved individuals outside of a prescribed time period, or beyond an approved duration. Such rules can be established by correctional staff, and can also be established by software of system 1000. Such unapproved communications can be terminated, for example after an early warning of impending termination, or abruptly after an initial exchange of unapproved content/keywords. System 1000 can then block further communication between the inmate and outside user until further communication is approved by correctional staff.

In one embodiment, video visitation is a two way real time video and audio streaming conference, which can be schedule by the inmate or an outside user using system 1000. Video visitation can be implemented with security rules enforced by system 1000. For example, the inmate must be available during the scheduled time, and must have privileges for video visitation, the duration of the visitation session must not exceed a maximum allowable period, for example 30 minutes, particularly when using a general use kiosk, and the outside user must be preapproved for communicating with the inmate.

In accordance with the disclosure, a schedule may be made available to inmates, correctional facility, and outside users, illustrating scheduled digital data exchanges, and particularly for audio and video streaming visitations. Security requirements of a correctional facility may require that all real time streams are scheduled, so that correctional staff can monitor such streams as they take place, or optionally with a time delay. Accordingly, the amount of time an inmate may participate can be limited, to ensure there are adequate staff available, and to control use of available resources, including for example equipment and personnel. In one embodiment, all potential participants can propose scheduled times; however, an ability to schedule a time may be restricted by participant, time, duration, subject matter, style of stream (e.g. chat, audio, or video), availability of particular monitoring staff, past conduct of an inmate, or other factors.

Referring now to FIG. 22, three local executable application display images, or local images 5040, 5042, 5044, illustrate visible portions of instances of local app 5000 executing on either a player 2000 or kiosk 3000, the images being separated by a divider in FIG. 22. In local image 5040, an offer to purchase a player 2000 is presented, the player purchasable using credits of the inmate, within system 1000.

Music may be selected and purchased, as detailed elsewhere herein. In local image 5042, it may be seen that album artwork 5046 can be viewed, together with other information, which can include the track name, artist name, and album name, and other related information about any aspect of the track, for example duration and cost. An inmate may search for music within the available music library by keyword relating to the music of interest, and may search by genre 5046, as shown in local image 5044. Purchased music may be stored on player 2000, or may be played using kiosk 3000. In one embodiment, a purchase of music must be completed on kiosk 3000, which has access to a music library or depository, and which can be updated regularly, for example daily, although a direct purchase from player 2000 can also be implemented. In addition, other digital content such as books, videos, shows, movies, news, or educational content may be provided in a like manner as described for music. Some content may be provided at no cost or charge, for example health, safety, or facility regulations, which may pertain to the correctional facility providing system 1000.

In one embodiment, music samples or segments of songs or other digital content may be listened to by an inmate prior to purchase. This is particularly important to avoid confusion, particularly if the content library or catalog from which the inmate may select contains millions of songs or videos, many of which may have similar names.

In one embodiment, illustrated in three local executable application images, or local images 5050, 5052, 5054 of FIG. 23, inmates may purchase products, for example using credits, from an approved supply location, for example a commissary of the correctional facility. In local image 5050, an inmate may search by category 5056, then may select a size 5058 of an item within the category, although any shopping cart style implementation can be used. In this embodiment, once an item is selected, more information 5060 can be displayed, for example images of the item, the quantity desired, a description of the item, the price, a total, and an opportunity to check out 5062, or summarize the purchase transaction. In local image 5054, a summary 5064 of information pertaining to the items to be purchased is shown, and an inmate may click or indicate 'select' 5066 to complete the transaction, which can result in credits of an inmate's account being deducted, or credited if returns are permitted.

In an embodiment, the inventory available is the same as product currently available in an existing commissary system of the correctional facility, or alternatively, may include product which is available elsewhere, and is supplied to a local commissary or package distribution department, for distribution to the inmate. System 1000 can be electronically integrated with a local commissary system, and as described herein, can manage a system of credits allocated to an inmate, including accepting transfers of money by outside users, to allocate credits for inmates. All aspects of system 1000 are thus advantageously integrated, to avoid duplication of work, and to obtain synergy and reliability of the whole, including the integration of purchasing, communication between inmates and outside users (including correctional staff), allocation of credit to inmates, storage of digital content purchased by inmates, and review, analysis, and storage of inmate communications.

In FIG. 24, two local executable application images, or local images 5070 and 5072 are illustrated. In local image 5070, an inmate may submit a request for support pertaining to the use of system 1000. As with other communications by inmates, these communications can be prescreened by system 1000 for keywords, and may also be screened, and responded to, by correctional staff. Support ticket requests may also be routed to an administrative support organization associated with an implementer or provider of system 1000.

In local image 5072, an inmate may submit a grievance, request, or notification to correctional staff, who can answer within system 1000. As in all aspects of system 1000, inmates and outside users, which includes correctional facility staff, can be notified by email, or other alert, for example an alarm within system 1000, or a text message sent to the users cell phone, of events within the system. Further, system 1000 can integrate with and accept data from email and text messaging, whereby outside users can submit communications to system 1000 using these methods, or other communication methods available to outside users, generally. A drop down text box 5076 enables the inmate (or if web app 3000 an outside user) to select from a list of possible subjects.

The grievance request can pertain to problems an inmate is having with system 1000, or any other problem, concern, or notification the user wishes to communicate to correctional staff. As with local image 5072, a drop down text box 5078 enables a selection of possible grievance subjects. As with all communications within system 1000, limits can be placed on size, content, and frequency of communication, by inmates, outside users, and or staff.

Admin image 6100 is a portion of a screen image generated by an administration software application, or admin app 6000, of system 1000. Admin app 6000 provides a central administration system for managing support and grievance requests, as well as any other matters described herein which are managed by correctional staff, and or an administrator of system 1000. Admin app 6000, among other functions, enables a support or grievance ticket, representing a support or grievance request 6102, to be reviewed and responded to 6104 by appropriate staff. In the example of admin image 6100, a correctional staffperson is resolving a question of an inmate, in a communication with an administrative staffperson associated with system 1000.

With reference to FIG. 25, a banking system application, or bank app 7000 for use by inmates is illustrated. In accordance with the disclosure, negotiable funds in currency are converted to credits which may be allocated by the inmate for the purchase of authorized items or services within system 1000. Portions of two banking images 7002 and 7004, illustrative of screens generated by banking app 7000, are shown. In banking image 7002, an inmate may allocate credits or funds from a first account to a media account 7010, for the purchase of digital content as described herein. In one embodiment, an inmate may also allocate credits or funds from a first account to purchase "stamps" 7012, as described herein, which may be used for particular activities, including for example digital correspondence or inbound package or mail shipments. In banking image 7004, an inmate may view a summary or detail 7014 of activity affecting their account, and may request a printout 7016 of their account, if a printer is available. A portion of the printout 7018 appears in image 7006. Bank app 7000 can provide a complete trust account banking and accounting system for inmates, or can supplement or complement a trust account system of a correctional facility.

In FIG. 26, music image 5100 depicts a screen image generated by music playing software of local app 5000, in this example executing upon player 2000. A plurality of fields 5102 indicate information pertaining to the track currently playing, and can additionally display the total number of tracks available and the duration of the current track 5104, and or the rating 5106 given by the inmate. It can further be possible to sort available tracks 5108. Many other functions not shown in the figures, but known in the art or hereinafter developed, may be supported by player 2000 and kiosk 3000. Further, while the images are in black and white, as required herein, it should be understood that displays 2102 and 3006 can display color. In an embodiment, other tasks of player 2000 or kiosk 3000, as described herein, may be carried out while music is being played. Player 2000 can further include, for example, an FM radio application and receiver, a clock, and games.

In one embodiment, player 2000 includes a setting section of local app 5000 which contains or encodes identification information, for example the inmate name and or an identification number, for the inmate to whom the player 2000 was assigned. This identification can be displayed on a home or startup screen, as well, so that correctional staff can quickly ensure the player belongs to the inmate who is in possession of it. Further, the identification information cannot be changed by the inmate, and is used by the kiosk or local server when communicating with player 2000, to ensure content is delivered only to the appropriate player and inmate. Local app 5000 configured for player 2000 further ensures that player 2000 cannot be connected to any other than devices of system 1000, for example kiosk 3000 or local server 9000, which devices will preserve and observe encoded security measures. An attempted connection to another device can trigger a failure message upon the display, and can activate an alarm sound or communication of the event to local server 9000 and or kiosk 3000, for example the next time player 2000 is connected thereto.

In one embodiment, when an inmate wishes to use kiosk 3000, they can be required to enter a username, for example their offender ID #, and a corresponding password. Accordingly, a preregistration and assignment of a password can be required to be carried out before use of a kiosk 3000. System 1000 may assign an initial password, after which an inmate can be required to change the password. Support can also be provided for a lost or compromised password, and optionally notification to correctional staff of the event.

The foregoing description of possible implementations consistent with the present disclosure does not represent a comprehensive list of all such implementations or all variations of the implementations described. The description of only some implementation should not be construed as an intent to exclude other implementations. Artisans will understand how to implement the disclosure in many other ways, using equivalents and alternatives that do not depart from the scope of the following claims. Moreover, unless indicated to the contrary in the preceding description, none of the components described in the implementations are essential to the disclosure.

Figure 27:
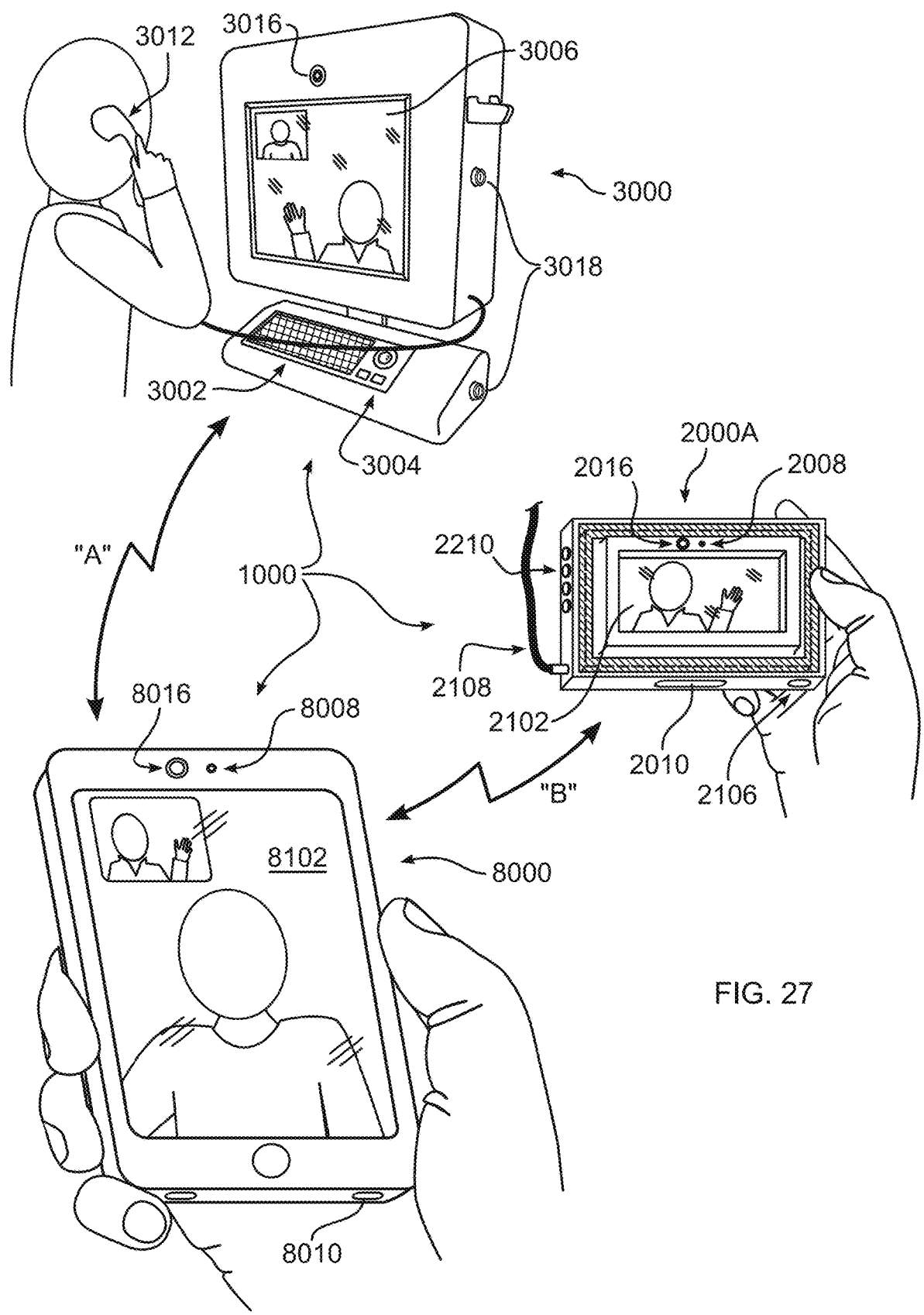
FIG. 27 depicts applications of the disclosure in use between an outside user using a cellphone, and a kiosk and a player of the disclosure.

More particularly, in accordance with another embodiment of the disclosure, and with reference to FIG. 27, outside users of system 1000 can conduct video visitation using a commercially generally available mobile computing device 8000, including a cellphone, handheld tablet, or laptop. Mobile device 8000 executes software which is a part of system 1000, and accordingly mobile device 8000 forms part of system 1000, and enforces the security measures described herein. More particularly, a mobile software application, or mobile app 8100, stored within mobile device 8000 and executing within mobile device 8000, submits all digital content for preapproval by correctional staff, and no digital content is forwarded to an inmate until it has met all security requirements, which can include approval of the sender, approval of the digital contents, approval of the time, and authorization of the inmate, for example. Herein, all streaming content is subject to real time review by correctional staff, who can discontinue the stream if an attempt is made to exchange non-allowed content.

While it is advantageous to carry out the disclosure using a small lightweight device, such as mobile device 8000, which is optimized to be easily used while being held in one hand, it should be understood that the discussion herein with respect to mobile device 8000 can also apply to laptops and desktop computing devices, as well.

In one embodiment, correctional staff can optionally impose a streaming time delay if deemed necessary, whereby staff has time to block content before it is heard by a user. The time delay can be imposed in one or both directions, whereby content provided by either the outside user or the inmate can be subject to pre-review. When the time delay is imposed, the sending user must wait at least for the time delay period in order to receive a corresponding reply from the receiving user.

To produce quality results, it is advantageous for the mobile computing device to be connected to a network in communication with player 2000 or kiosk 3000 of sufficient bandwidth to produce the appearance of smooth, timely motion and sound for each participant. This may typically be accomplished with, for example, a 3G, 4G, or wired or wireless internet connection, where the internet connection has sufficient bandwidth, for example at least 1 Mbps.

With further reference to FIG. 27, it may be seen that an inmate can communicate with an outside user using mobile device 8000 from a kiosk, using a network indicated by arrow "A". In one embodiment of the disclosure, it can also be possible for an inmate to communicate with an outside user using a player 2000A, which is similar to player 2000, but includes a video camera recorder 2016 and a microphone 2008, and optionally a speaker 2010, using a network indicated by arrow "B". In one embodiment, an inmate cannot use player 2000 to communicate unless correctional staff authorize such use using system 1000, for example authorizing communication during a particular time period, for communicating with a particular outside user, and optionally only when correctional staff are available to monitor the communication. Software of system 1000, executing within player 2000, enforces these rules, for example obtaining such authorization wirelessly from a local server of system 1000.

Networks "A" and "B" are typically non-wired over at least a portion of the communication channel, for example between mobile device 8000 and a cellular network. Kiosk 3000 is typically connected to the internet using a wired connection, and therefore the remainder of network "A" could be wired. In the case of network "B", player 2000 or 2000A can communicate wirelessly using an internal transmitter and receiver, but may communicate to a local server which is wired to the internet. Alternatively, it is possible for kiosk 3000 to have a wireless transmitter and receiver, and player 2000, 2000A to be connected by port 2106, and accordingly, either network "A" or "B" may be all or partly wireless, or all or partly wired.

In one embodiment, player 2000 or 2000A plays streaming or prerecorded video generated by correctional facility staff, in a one way transmission. In another embodiment, a two way communication with between one or a plurality of correctional staff, and one or a plurality of inmates is enabled by system 1000. An example of one correctional staff and one inmate communicating is a counseling session. An example of a plurality of correctional staff and a plurality of inmates is a "town hall" meeting. Other examples, including uses for communication between a plurality of staff and a single inmate, or a plurality of inmates and a single staffperson, would be apparent to one skilled in the art. In all such implementations of system 1000, it is not necessary for the inmate and the staffperson to be in the same room, which is likewise the case for communication between inmates and outside users. In all cases, the burdens of moving inmates between locations, and the attendant security issues, are eliminated. In accordance with an embodiment, a plurality of correctional staff can either participate in, or simply monitor a data stream.

In another embodiment, a plurality of outside users can participate in a group data stream with an inmate, or an inmate together with correctional staff. The data stream can include one or a mix of chat, email, audio only, or video with audio, each participant selecting the modality of their choice. In all embodiments where multiple participants are involved, a plurality of windows may be presented on a display of a user's system 2000, 3000, 2000A, or 8000/9000 (discussed below), each window containing information pertaining to a different stream, for example different video visitation streams.

In a further embodiment, some or all video visitation or other communication sessions are stored, for later review by, for example, correctional facility staff, justice department employees, counselors, attorneys, the inmate, or the outside user. In one embodiment, participants may obtain digital content controlled by system 1000 at any time, including after an inmate is released. A fee can be charged, collected for example using system 1000, to cover the cost of storage, or such content can be archived and made available for a profit. Moreover, all of the functionality and services described herein with respect to system 1000, including the provision of hardware and software, digital content, bandwidth, support, archiving, data warehousing and mining, and customization, can be made available for a fee chargeable to some or all users of system 1000, for example according to use, relieving the correctional facility of administrative burdens and system costs, and enabling the implementation and maintenance of system 1000 over time.

In accordance with a further embodiment, inmates and or outside users can be notified, or be able to determine, when other system users are available for text chat, streaming video, or other form of communication. For example, local app 5000 can be informed when a mobile device 8000 is online and available for an exchange of digital content, for example using information pertaining to the mobile phone number, MAC address, or other identification provided by mobile app 8100 or native app 8200, advantageously with prior approval from the outside user. In one embodiment, such notification may be enabled only after authorization by correctional staff. System 1000 enables and fosters an ability of inmates to communicate with the outside world, when appropriate, in order for inmates to be better prepared to ultimately successfully reintegrate into society.

As noted above, an outside user can use web app 4000 or mobile app 8100. Additionally, an outside user can use software of system 1000 executing on a desktop computer or any other computing device, whether intended to be mobile or not, the software written specifically for the particular hardware environment, and not executing within a browser. Such natively executing software, or native app 8200, can be implemented in a native language, such as C++, or may execute within a programming environment developed for the computing device, such as JAVA or .NET. Advantages of a native app can include, in some circumstances, real time toggling of different audio and video devices, near real-time detection of and reaction to fluctuating bandwidth, different sizing options (including full screen), and prioritization of frame-rate/resolution.

Additionally, the native app 8200 can more easily enable a local server 9000, or a remotely connected server, to detect when, for example, an outside user is logged into native app 8200. An inmate using kiosk 3000 will then be able to see that the outside user is connected to the server, and will be able to initiate a video visit using funds from the inmate's media account. The length of the visit will be limited by the remainder of the time left on the inmate's session, or other duration limit set within system 1000 by correctional staff.

A cellular type mobile device executing mobile app 8100, can sometimes have different capabilities than, for example a tablet type device executing mobile app 8100, or native app 8200. Mobile app 8100 and native app 8200 are thus available in one or more versions, which can self configure to best utilize available hardware. In one embodiment, for example, an inmate using a cellular device could be enabled to see a particular outside user as being online, and could similarly be enable and authorized to initiate a video visit. In this event, the customer, if using mobile app 8100, could toggle between front and back facing cameras, or alternatively, could turn off video support. Headset support can also be enabled. Tablet class mobile devices, for example, can be enabled to support resizing of a video stream, and can further be configured to prioritize a frame rate and or a resolution. Mobile device 8000 can include one or more of a video camera 8016, microphone 8008, speaker 8010, display 8102, and processor 8014 (not shown).

A desktop computing system (not shown) 9800 can also be used by an outside user, and can run a desktop app 9900 which functions as described for mobile app 8100, and which executes software designed for a particular hardware environment, and can take optimal advantage of an ability to control hardware of the desktop computer (not shown), including toggling enablement of a camera or microphone, changing video resolution or frame rate, and engaging in other optimizations to improve the quality of streaming digital data, including video visitation data. For example, a desktop system can analyze available bandwidth, and self configure software and hardware to produce effective results, for example smooth motion and acceptable sound quality when bandwidth is low, and superior results, for example high definition video and sound, when bandwidth is high.

More particularly, mobile app 8100 or desktop app 9900 can, in one embodiment, detect bandwidth from each participant, for example at the kiosk device as well as at the mobile device 8000 or desktop system 9800, and modify input/output to be supportable at the lowest bandwidth of either. Further, if during a streaming session, should bandwidth for one user drop, software of system 1000 executing on both ends, for both users, reconfigures to adapt for the new, lower bandwidth, advantageously within a few seconds of the bandwidth change. Specifically, the video resolution can be reduced, and can be increased again if bandwidth improves. Detection of the bandwidth change can be carried out efficiently, without using large amounts of bandwidth in the process, thereby negatively impacting available bandwidth. Bandwidth can be determined, for example, by measuring upload speed from a device.

By providing natively executing applications 8100, 9800, an ability to detect when a particular outside user is connected to the server is facilitated. For example, apps 8100, 9800 can periodically poll for such data, or can be remotely notified. In this manner, an inmate at a kiosk 3000, for example, can see who is available at a computer, and then initiate data exchange with an available outside user. As an inmate may have a limited opportunity to communicate using system 1000, this greatly increases an inmate's ability to have positive communication with the outside, and to ultimately successfully reintegrate into the outside world. Security can be enabled as described herein for system 1000, to restrict such communication to outside users permitted for a particular inmate. Such communication, which includes audio streaming, email, image exchange, and video visitation, can replace burdensome aspects of maintaining communication for inmates. For example, system 1000 can replace traditional phone systems, and phone visitation facilities, reduce in-person visits, and replace much written correspondence.

With reference to FIG. 28, a portion of a display generated by an administration application, or admin app 9500, of system 1000 is illustrated. While the example shows 'mail' and 'letters', it should be understood that 'mail' or 'letters' herein refers to any digital data or content, including pre-recorded emails, chats, audio messages or conversations, and video messages or conversations, all of which can be reviewed prior to distribution to an inmate, or to the intended outside user recipient. As may be seen in the column entitled "Mail" at left, there are portions of admin app 9500 for a variety of functions, including: lists of letters delivered; summary reports of all mail sent and received, which may be used to select letters, whereupon additional detail is provided; lists of support tickets delivered; searching, for example for keywords, which include text as well as sounds and images, for example sounds corresponding to words, or images corresponding to people or prohibited objects or activities; mail operational reports, for all mail or focused upon inbound mail, including activities taken, and current status of particular letters; stamp usage reports; lists and detail for discarded inbound digital content; and deleted digital content that has been recovered, or that is recoverable.

At the center, in FIG. 28, are links to portions of admin app 9500 pertaining to various functions associated with inbound mail, including lists of mail pending approval; mail ready for release and delivery; selection of mail for printing; lists of mail that has been released; lists of mail that has been routed for further security checks (Inspections and Investigations); mail that has been returned to a "customer", or outside user; and mail that has been rejected for delivery, e.g. for improper content, wrong addressee, or other defect. At right, in FIG. 28, are links to portions of admin app 9500 pertaining to functions corresponding to inbound mail, but for outbound mail to outside users, for example.

FIG. 29 illustrates a screen image generated by admin app 9500 when the 'Requires Approval' item in FIG. 28 is selected. Details regarding an email are illustrated, showing the results of a keyword search performed automatically by system 1000, in which suspicious content is summarized 9512, in this example foreign language words flagged as requiring attention by a Spanish speaking staffperson. Additionally, a particular word 9514 is flagged by the system for further inspection. Keywords in each example may have been established by being identified in historical digital content which was problematic, the keywords added to a master list by staffpeople, or preprogrammed within system 1000. In FIG. 29, the reviewing staffperson can read the entire message, and take an action 9516 as indicated at right.

Figure 30:
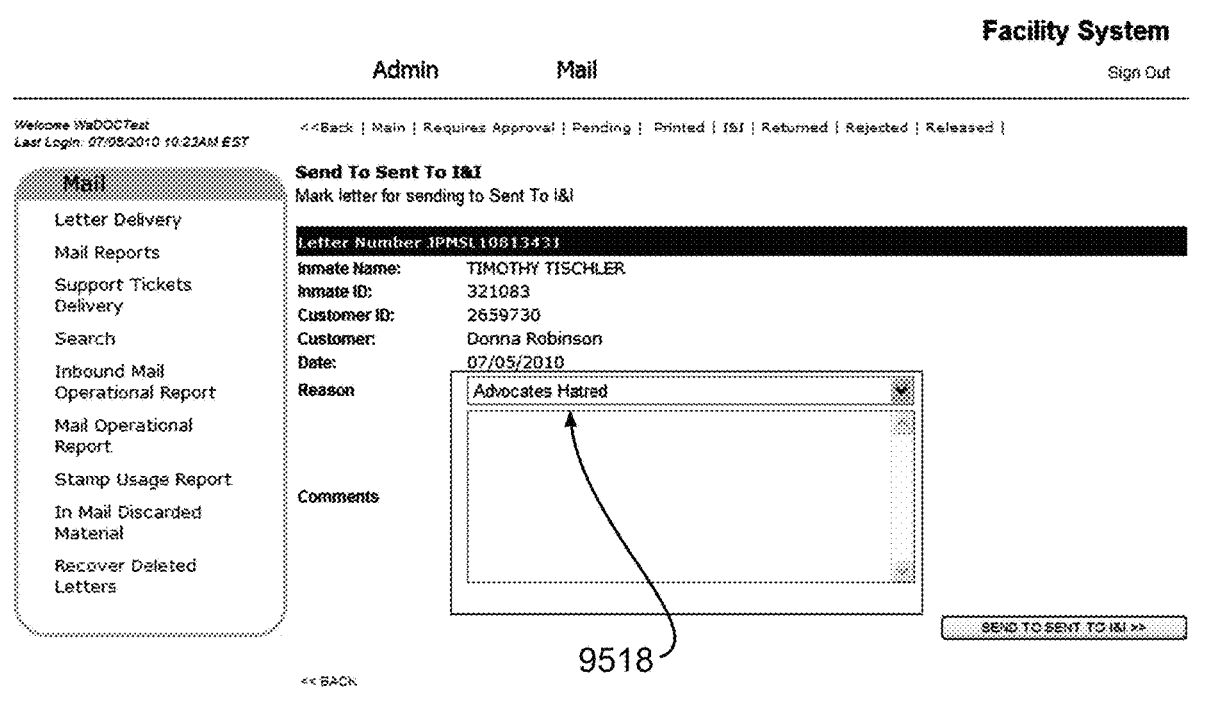

FIG. 30 illustrates a screen image generated by admin app 9500 when the item "Send to 'Sent to I&I'" is selected in FIG. 29. In this example, the review selects from a drop down list 9518 of reasons for forwarding the digital content for additional investigation. In subsequent steps, other correctional staff can quickly understand why the digital content was forwarded to them for additional investigation, and staff can take appropriate action. Access to the digital content giving rise to the investigation is centrally stored, so that it may be access by all staffpersons involved in the initial review and follow-on investigation.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A touchscreen kiosk configured to provide inmates of a controlled-environment facility with access to content stored by a content system, wherein the kiosk is configured to:
    identify a first inmate using the kiosk based on inputs provided by the first inmate, wherein the inputs comprise an inmate identifier provided by the first inmate;
    determine a coupling of a first personal portable inmate device to the kiosk;
    receive a unique inmate identifier from the first personal portable inmate device, wherein the unique inmate identifier is permanently encoded in a memory of the first personal portable inmate device;
    determine when the inputs provided by the first inmate match the unique inmate identifier received from the first personal portable inmate device; and
    when the inputs provided by the first inmate do not match the unique inmate identifier received from the first personal portable inmate device, lock the first personal portable inmate device.

2. The kiosk of claim 1, wherein the kiosk prevents the inmates from accessing an operating system of the kiosk.

3. The kiosk of claim 1, wherein the kiosk is further configured to transfer content stored by the content system to the first personal portable inmate device when the inputs provided by the first inmate match the unique inmate identifier received from the first personal portable inmate device.

4. The kiosk of claim 3, wherein the content transferred from the content system to the first personal portable inmate device is not saved to a file system of the kiosk.

5. The kiosk of claim 1, wherein the locking of the first personal portable inmate device disables the first personal portable inmate device from further use.

6. The kiosk of claim 1, wherein the kiosk is limited, when the inputs provided by the first inmate match the unique inmate identifier received from the first personal portable inmate device, to accessing an account of the first inmate maintained by the content system.

7. The kiosk of claim 3, wherein the kiosk locks the first personal portable inmate device during intervals other than during the transfer of content from the content system to the first personal portable inmate device.

8. The kiosk of claim 3, wherein the content transferred from the content system to the first personal portable inmate device is encrypted and wherein the first personal portable inmate device decrypts the transferred content using a key retrieved from a secure storage of the first personal portable inmate device.

9. The kiosk of claim 8, wherein the transferred content comprises audio and wherein the audio remains encrypted until being handed off to a sound card of the first personal portable inmate device.

10. A system configured to provide an inmate of a controlled-environment facility with access to content stored by a content system, the system comprises:
    a touchscreen kiosk configured to:
        identify a first inmate using the kiosk based on inputs provided by the first inmate, wherein the inputs comprise an inmate identifier provided by the first inmate;
        detect a coupling of a first personal portable inmate device to a kiosk;
        determine when the inputs provided by the first inmate match a unique inmate identifier received from the first personal portable inmate device;
        when the inputs provided by the first inmate do not match the unique inmate identifier received from the first personal portable inmate device, lock the first personal portable inmate device; and
    the first personal portable inmate device identified by a unique machine identifier, wherein the first personal portable inmate device is configured to:
        couple to the kiosk;
        transmit the unique inmate identifier to the kiosk via the coupling, wherein the transmitted unique inmate identifier is permanently encoded in a memory of the first personal portable inmate device.

11. The system of claim 10, wherein the locking of the first personal portable inmate device by the kiosk disables the first personal portable inmate device from further use.

12. The system of claim 10, wherein the locking of the first personal portable inmate device by the kiosk disables an account of the first inmate maintained by the content system.

13. The system of claim 10, wherein the locking of the first personal portable inmate device by the kiosk prevents the first personal portable inmate device from receiving files.

14. The system of claim 10, wherein the kiosk is further configured to transfer content stored by the content system to the first personal portable inmate device when the inputs provided by the first inmate match the unique inmate identifier received from the first personal portable inmate device.

15. The system of claim 14, wherein the content transferred from the content system to the first personal portable inmate device is bound to the first personal portable inmate device using the unique machine identifier of the first personal portable inmate device.

16. The system of claim 10, wherein the kiosk is limited to accessing an account of the first inmate maintained by the content system when the inputs provided by the first inmate match the unique inmate identifier received from the first personal portable inmate device.

17. A method for providing an inmate of a controlled-environment facility with access to content stored by a content system, the method comprises:

identifying a first inmate using a touchscreen kiosk based on inputs provided by the first inmate, the inputs comprising an inmate identifier provided by the first inmate;

detecting a coupling of a first personal portable inmate device to a kiosk, wherein the first personal portable inmate device is identified by a unique machine identifier;

detecting a unique inmate identifier transmitted from the first personal portable inmate device to the kiosk via the coupling, wherein the transmitted unique inmate identifier is permanently encoded in a memory of the first personal portable inmate device;

determining when the inputs provided by the first inmate match a unique inmate identifier received from the first personal portable inmate device; and when the inputs provided by the first inmate do not match the unique inmate identifier received from the first personal portable inmate device, locking the first personal portable inmate device.

18. The method of claim 17, wherein the locking of the first personal portable inmate device disables the first personal portable inmate device from further use.

19. The method of claim 18, further comprising:

transferring, by the kiosk, content stored by the content system to the first personal portable inmate device when the inputs provided by the first inmate match the unique inmate identifier received from the first personal portable inmate device.

20. The method of claim 19, wherein the content transferred from the content system to the first personal portable inmate device is bound to the first personal portable inmate device using the unique machine identifier of the first personal portable inmate device.

* * * * *